United States Patent
Eberlein

(10) Patent No.: US 7,525,483 B2
(45) Date of Patent: Apr. 28, 2009

(54) RECEIVE DEVICE AND METHOD FOR RECEIVING A RECEIVE SEQUENCE

(75) Inventor: Ernst Eberlein, Grossen-Seebach (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 11/762,704

(22) Filed: Jun. 13, 2007

(65) Prior Publication Data

US 2008/0012768 A1 Jan. 17, 2008

Related U.S. Application Data

(63) Continuation of application No. PCT/EP2005/013365, filed on Dec. 13, 2005.

(30) Foreign Application Priority Data

Dec. 13, 2004 (DE) .................. 10 2004 059 957

(51) Int. Cl.
*G01S 1/24* (2006.01)
*H04J 3/00* (2006.01)

(52) U.S. Cl. ..................... 342/387; 370/345
(58) Field of Classification Search ................. 342/378, 342/387; 370/345
See application file for complete search history.

(56) References Cited

U.S. PATENT DOCUMENTS 4,803,703 A 2/1989 DeLuca
5,090,028 A 2/1992 Crebouw
5,343,497 A 8/1994 Canosi
5,373,536 A 12/1994 Dehner, Jr.
5,960,047 A 9/1999 Proctor, Jr.
6,009,334 A 12/1999 Grubeck et al.
6,424,683 B1 7/2002 Schollhorn
2001/0033603 A1 10/2001 Olaker
2002/0009166 A1 1/2002 Steffens
2002/0114354 A1 8/2002 Sinha
2003/0128161 A1 7/2003 Oh et al.
2003/0215035 A1 11/2003 Amerga
2003/0227895 A1 12/2003 Strutt et al.

(Continued)

FOREIGN PATENT DOCUMENTS

DE 19802373 C1 6/1999

(Continued)

OTHER PUBLICATIONS

Li, Xinrong; *Super-Resolution TOA Estimation with Diversity for Indoor Geolocation*; 2004; IEEE.

(Continued)

*Primary Examiner*—Thomas H Tarcza
*Assistant Examiner*—Harry Liu
(74) *Attorney, Agent, or Firm*—Michael A. Glenn; Glenn Patent Group

(57) ABSTRACT

A receive device for determining a location of a transmitter device includes an evaluator formed to determine a first location of the transmitter device from a time of arrival of a first receive sequence, and a second location of the transmitter device from a time of arrival of a second receive sequence. In addition, the receive device includes a combiner formed to determine the location of the transmitter device from the first location and the second location.

21 Claims, 35 Drawing Sheets

U.S. PATENT DOCUMENTS

| | | |
|---|---|---|
| 2004/0072579 A1 | 4/2004 | Hottinen |
| 2004/0157621 A1* | 8/2004 | Yamasaki et al. ........ 455/456.1 |
| 2004/0170197 A1 | 9/2004 | Mehta |
| 2004/0203871 A1 | 10/2004 | Geier |
| 2004/0240569 A1 | 12/2004 | Rudowicz |
| 2005/0089083 A1* | 4/2005 | Fisher et al. ................ 375/130 |
| 2006/0077944 A1* | 4/2006 | Ghosh et al. ................ 370/344 |
| 2007/0230431 A1* | 10/2007 | Driesen et al. ............. 370/345 |

FOREIGN PATENT DOCUMENTS

| | | |
|---|---|---|
| DE | 199 17 337 | 10/2000 |
| EP | 820 156 | 1/1998 |
| EP | 0820156 A2 | 1/1998 |
| EP | 0933882 A2 | 8/1999 |
| EP | 1 032 157 | 8/2000 |
| EP | 1089452 A1 | 4/2001 |
| EP | 1130793 A1 | 9/2001 |
| EP | 1206068 A2 | 5/2002 |
| EP | 1322061 A2 | 6/2003 |
| WO | WO 87/01490 A1 | 3/1987 |
| WO | WO 03/001699 A1 | 1/2003 |
| WO | WO 03/090400 A1 | 10/2003 |
| WO | WO 2005/098465 A2 | 10/2005 |

OTHER PUBLICATIONS

N. Fliege, Multiraten-Signalverarbeitung, 1993, B.G. Teubner Stuttgard, pp. 256-258.

Fredric J. Harris, Multirate Signal Processing for Communication Systems, May 14, 2004, Prentice Hall, pp. 400-409.

* cited by examiner

RRC024

RRC10

(1) 1 B_cycle_48
(2) 1 B_cycle
(3) OVERALL DELAY IN THE A BURST GENERATION
(4) DELAY DUE TO PIPELINING ETC.
(5) CUMULATED FILTER GROUP RUN TIMES (=CUMULATED TRANSIENT TIMES)
(6) LENGTH a_burstlen (IN B_cycles_48) OF THE UNDERLYING AND OF THE RELEVANT A BURST AS WILL BE CONTEMPLATED IN THE FOLLOWING
(7) CUMULATED DECAY TIMES OF THE FILTERS
(8) LENGTH OF THE GENERATED A BURST IN B_samples

| Name | Type | Owner | Date |
|---|---|---|---|
| a_burstperiod | Var | blg | 27.9.03 |

| Description |
|---|
| Distance between the starts of two successive A bursts, i.e. duration of an acquisition period |

| Interacts with | | | Subscribers | |
|---|---|---|---|---|
| Acquisition algorithm | | | std | |
| Value | Unit | State/Min | Max | Quant |
| | S_cycles | 1 | 16777215 | 1 |

| Comment |
|---|
| - must comply with: a_burstperiod = at_multipl_len * t_burstperiod |
| - min. 1 A Burst/s, max. 100 |

FIGURE 10A

| Name | Type | Owner | Date |
|---|---|---|---|
| a_initdel | Var | blg | 1.10.03 |

| Description |
|---|
| Distance from the triggering for the generation of the A burst to the first generated B_sample of the relevant A_Burst |

| Interacts with | | | Subscribers | |
|---|---|---|---|---|
| Interaction between acquisition and tracking algo | | | std, shn, koe, fhf | |
| Value | Unit | State/Min | Max | Quant |
| | B_cycles | 0 | 15 | 1 |

| Comment |
|---|
| |

FIGURE 10B

| Name | Type | Owner | Date |
|---|---|---|---|
| a_maximpwiden | Const | blg | 9.1.04 |
| Description | | | |
| Max. cumulated pulse broadening of all dispersive filters in the transmitter for the A burst with regard to a B_sample_48 pulse | | | |
| Interacts with | | Subscribers | |
| Time multiplex scheme, receiver | | std, shn, koe | |

| Value | Unit | State/Min | Max | Quant |
|---|---|---|---|---|
| TBD??? | B_sample | | | |

| Comment |
|---|
| Best to take a value as we have it for the implemented minitransmitter, and to add a little implementation margin for future transmitters |

FIGURE 10C

| Name | Type | Owner | Date |
|---|---|---|---|
| ant_choice_mask | Var | blg | 27.9.03 |
| Description | | | |
| Bit mask for selecting between the two transmit antennas | | | |
| Interacts with | | Subscribers | |
| Transmitter HF unit | | shn, olr | |

| Value | Unit | State/Min | Max | Quant |
|---|---|---|---|---|
| | - | | | 2 Bits |

| Comment |
|---|
| - ant_choice_mask==00 (LSB right side): always transmit on antenna 0<br>- ant_choice_mask==01: begin with antenna 0, shift after every T burst<br>- ant_choice_mask==10: begin with antenna 0, shift every other T burst<br>- ant_choice_mask==11: not permitted |

FIGURE 10D

| Name | Type | Owner | Date |
|---|---|---|---|
| at_dist | Var | Blg | 27.9.03 |
| Description | | | |
| Distance from the triggering for the generation of the A burst to the start of the subsequent T burst | | | |
| Interacts with | | Subscribers | |
| Interaction between acquisition and tracking algo | | std, shn, koe, fhf | |
| Value | Unit | State/Min | Max | Quant |
| | S_cycles | 1. | 2047 | 1 |
| Comment | | | | |
| | | | | |

FIGURE 10E

| Name | Type | Owner | Date |
|---|---|---|---|
| at_multipl_len | Var | blg | 27.9.03 |
| Description | | | |
| Number of T bursts between two A bursts, i.e. within one acquisition period | | | |
| Interacts with | | Subscribers | |
| Channel allocation | | hfn, std, shn | |
| Value | Unit | State/Min | Max | Quant |
| | without units | 1 | 2047 | 1 |
| Comment | | | | |
| What is desired is at least 10 A bursts per second | | | | |

FIGURE 10F

| Name | Type | Owner | Date |
|---|---|---|---|
| B_clock | Const | oehler | 24.9.03 |
| Description ||||
| Basic sampling frequency for digital signal processing in the transmitter (prior to the interpolator filter preDACfilt prior to the DAC) and in the receiver ||||

| Interacts with | | Subscribers | | |
|---|---|---|---|---|
| D_clock, transmitter, entire air interface, receiver | | rtk, blg, std, koe, fhf | | |
| Value | Unit | State/Min | Max | Quant |
| | | Frozen | | |
| Comment |||||
| B_clock=D_clock/2 |||||

FIGURE 10G

| Name | Type | Owner | Date |
|---|---|---|---|
| carfreq | Const | oehler | 24.9.03 |
| Description ||||
| Carrier frequency = center frequency of the HF signal ||||

| Interacts with | | Subscribers | | |
|---|---|---|---|---|
| t_burstbw | | blg, koe | | |
| Value | Unit | State/Min | Max | Quant |
| | | Frozen | | |
| Comment |||||
| |||||

FIGURE 10H

| Name | Type | Owner | Date |
|---|---|---|---|
| D_clock | Const | oehler | 24.9.03 |
| Description ||||
| Sampling frequency of the DAC in the transmitter, and of the ADC in the receiver ||||
| Interacts with ||Subscribers ||
| B_clock ||blg, hpj, koe ||
| Value | Unit | State/Min | Max | Quant |
|  |  | Frozen |  |  |
| Comment |||||
|  |||||

FIGURE 10I

| Name | Type | Owner | Date |
|---|---|---|---|
| frame_len | Const | blg | 1.10.03 |
| Description ||||
| Length of a frame for data transmission ||||
| Interacts with ||Subscribers ||
|  ||  ||
| Value | Unit | State/Min | Max | Quant |
|  |  | Frozen |  | 1 |
| Comment |||||
| must meet the condition: frame_len = (nodatabits+12)*2+12+11 |||||

FIGURE 10J

| Name | Type | Owner | Date |
|---|---|---|---|
| halfburst1 | Var | blg | 1.10.03 |
| Description | | | |
| First halfburst for generating a T burst | | | |
| Interacts with | | Subscribers | |
| Transmitter, receiver | | - | |

| Value | Unit | State/Min | Max | Quant |
|---|---|---|---|---|
| | - | -1 | +1 | |

| Comment |
|---|
| - is a vector of the length of halfburstlen<br>- is present in B_samples for I and Q components, respectively<br>- is optimally controlled, i.e. the extreme values of 1 and +1 are actually adopted<br>- may have various effective powers |

FIGURE 10K

| Name | Type | Owner | Date |
|---|---|---|---|
| halfburst2 | Var | blg | 1.10.03 |
| Description | | | |
| Second halfburst for generating a T burst | | | |
| Interacts with | | Subscribers | |
| Transmitter, receiver | | | |

| Value | Unit | State/Min | Max | Quant |
|---|---|---|---|---|
| | - | -1 | +1 | |

| Comment |
|---|
| - is a vector of the length of halfburstlen<br>- is present in B_samples for I and Q components, respectively<br>- is optimally controlled, i.e. the extreme values of 1 and +1 are actually adopted<br>- may have various effective powers |

FIGURE 10L

| Name | Type | Owner | Date |
|---|---|---|---|
| halfburstlen | Var | blg | 1.10.03 |
| Description | | | |
| Length of the T halfbursts halfburst1 and halfburst2 | | | |
| Interacts with | | Subscribers | |
| Transmitter, receiver | | - | |
| Value | Unit | State/Min | Max | Quant |
| | B_samples | 100 | s.u. | 1 |
| Comment | | | | |
| must meet the condition:<br>    halfburstlen <= (t_burstmaxlen + overlapmaxlen)/2 | | | | |

FIGURE 10M

| Name | Type | Owner | Date |
|---|---|---|---|
| ilvshift | Const | blg | 1.10.03 |
| Description | | | |
| Index shift within modulo interleaver | | | |
| Interacts with | | Subscribers | |
| Transmitter | | shn | |
| Value | Unit | State/Min | Max | Quant |
| 17 | - | Frozen | | 1 |
| Comment | | | | |
| Important condition: must be selected relative prime to nocodebits,<br>otherwise not all bits of the interleaver input will be reached | | | | |

FIGURE 10N

| Name | Type | Owner | Date |
|---|---|---|---|
| maxfreqoffsppm | Const | rtk | 24.9.03 |//
| Description ||||
| Max. relative frequency offset in the transmitter ||||
| Interacts with || Subscribers ||
| a_nopartcorrs, t_nopartcorrs || std, blg ||
| Value | Unit | State/Min | Max | Quant |
| 30 | ppm | TBC | | |
| Comment |||||
| |||||

FIGURE 10O

| Name | Type | Owner | Date |
|---|---|---|---|
| nodatabits | Const | rtk | 1.10.03 |
| Description ||||
| Number of useful-data bits to be transmitted per frame ||||
| Interacts with || Subscribers ||
| Transmitter, frame_len || std, blg, shn ||
| Value | Unit | State/Min | Max | Quant |
| | | Frozen | | |
| Comment |||||
| |||||

FIGURE 10P

| Name | Type | Owner | Date |
|---|---|---|---|
| overlapmaxlen | Const | blg | 1.10.03 |
| Description | | | |
| Max. width of the overlap area of the T halfbursts halfburst1 and halfburst2 | | | |
| Interacts with | | Subscribers | |
| Transmitter, receiver | | shn | |
| Value | Unit | State/Min | Max | Quant |
| 32 | B_samples | | | |
| Comment | | | | |
| | | | | |

FIGURE 10Q

| Name | Type | Owner | Date |
|---|---|---|---|
| S_clock | Const | shn | 24.9.03 |
| Description | | | |
| Clock rate of the power management (for the "sleep" mode of the transmitter) | | | |
| Interacts with | | Subscribers | |
| Burst multiplex scheme | | blg, std, fhf | |
| Value | Unit | State/Min | Max | Quant |
| 10 | Mhz | Frozen | | |
| Comment | | | | |
| | | | | |

FIGURE 10R

| Name | Type | Owner | Date |
|---|---|---|---|
| senderSNIR | Const | rtk | 29.9.03 |

| Description |
|---|
| Target SNIR at the transmitter output |

| Interacts with | | | Subscribers | |
|---|---|---|---|---|
| System design, transmitter, receiver | | | blg, olr, shn, koe | |

| Value | Unit | State/Min | Max | Quant |
|---|---|---|---|---|
| 25 | dB | FROZEN | | |

| Comment |
|---|
| Is to be adhered to all in all by the transmitter (incl. quantization, intermodulation products etc.) |

FIGURE 10S

| Name | Type | Owner | Date |
|---|---|---|---|
| shift12 | Var | blg | 1.10.03 |

| Description |
|---|
| Delay of the T halfburst halfburst2 with regard to halfburst1 |

| Interacts with | | | Subscribers | |
|---|---|---|---|---|
| Transmitter, receiver | | | - | |

| Value | Unit | State/Min | Max | Quant |
|---|---|---|---|---|
| | B_samples | 100 | s.u. | 1 |

| Comment |
|---|
| - must meet the condition: shift12 + halfburstlen <= t_burstmaxlen<br>- must meet the condition: halfburstlen - shift12 <= overlapmaxlen |

FIGURE 10T

| Name | Type | Owner | Date |
|---|---|---|---|
| t_burstbw | Const | blg | 24.9.03 |
| Description | | | |
| Max. bandwidth of the T burst | | | |
| Interacts with | | Subscribers | |
| preDACfilt, transmit and receive filter, carfreq, selection of the T bursts | | hpj, oehler, fba, std | |
| Value | Unit | State/Min | Max | Quant |
| | | TBC | | |
| Comment | | | | |
| | | | | |

FIGURE 10U

| Name | Type | Owner | Date |
|---|---|---|---|
| t_burstlen | Var | blg | 29.9.03 |
| Description | | | |
| Length of a T burst | | | |
| Interacts with | | Subscribers | |
| - | | - | |
| Value | Unit | State/Min | Max | Quant |
| - | B_cycles | | t_burstmaxlen | 1 |
| Comment | | | | |
| | | | | |

FIGURE 10V

| Name | Type | Owner | Date |
|---|---|---|---|
| t_burstmaxlen | Const | blg | 29.9.03 |
| Description ||||
| Max. length of the T bursts ||||
| Interacts with || Subscribers ||
| T burst generation in the transmitter, structure of the tracking algo in the receiver || bur, koe, std ||
| Value | Unit | State/Min | Max | Quant |
|  |  | Frozen |  |  |
| Comment |||||
| must be a multiple of 8 |||||

FIGURE 10W

| Name | Type | Owner | Date |
|---|---|---|---|
| t_burstperiod | Var | blg | 27.9.03 |
| Description ||||
| Distance between the starts of two successive T bursts ||||
| Interacts with || Subscribers ||
| Tracking algorithm || shn, koe, fhf ||
| Value | Unit | State/Min | Max | Quant |
|  | S_cycles | 1 | 131071 | 1 |
| Comment |||||
| min. 90 T bursts/s, max. 2200 |||||

FIGURE 10X

| Name | Type | Owner | Date |
|---|---|---|---|
| t_choice_mask | Var | blg | 27.9.03 |
| Description | | | |
| Bit mask for selecting between the two T bursts stored | | | |
| Interacts with | | Subscribers | |
| Tracking algorithm | | shn, fhf, koe | |
| Value | Unit | State/Min | Max | Quant |
| | - | | | 2 Bits |
| Comment | | | | |
| - t_choice_mask==00 (LSB right side): always transmit T burst 0<br>- t_choice_mask==01: begin with T burst 0, shift after every T burst<br>- t_choice_mask==10: begin with T burst 0, shift every other T burst<br>- t_choice_mask==11: not permitted | | | | |

FIGURE 10Y

| Name | Type | Owner | Date |
|---|---|---|---|
| t0_sendburst | Var | blg | 29.9.03 |
| Description | | | |
| Zero-padded T burst 0 in the transmitter | | | |
| Interacts with | | Subscribers | |
| - | | bur | |
| Value | Unit | State/Min | Max | Quant |
| | - | -31 | +31 | 6-bit |
| Comment | | | | |
| - Vector of I and Q samples with a length t0_sendburstlen (in I/Q sample pairs)<br>- Zero-padding see above | | | | |

FIGURE 10Z

| Name | Type | Owner | Date |
|---|---|---|---|
| t1_sendburst | Var | blg | 29.9.03 |
| Description | | | |
| Zero-padded T burst 1 in the transmitter | | | |
| Interacts with | | Subscribers | |
| - | | bur | |
| Value | Unit | State/Min | Max | Quant |
| | - | -31 | +31 | 6-bit |
| Comment | | | | |
| - Vector of I and Q samples with a length t1_sendburstlen (in I/Q sample pairs)<br>- Zero-padding see above | | | | |

FIGURE 10AA

| Name | Type | Owner | Date |
|---|---|---|---|
| t_sendburstlen | Var | blg | 29.9.03 |
| Description | | | |
| Length of the zero-padded T bursts 0 and 1 in the transmitter | | | |
| Interacts with | | Subscribers | |
| - | | bur | |
| Value | Unit | State/Min | Max | Quant |
| | B_samples | 32 | t_burstmaxlen | 8 |
| Comment | | | | |
| must be a multiple of 8 | | | | |

FIGURE 10AB

| Name | Type | Owner | Date |
|---|---|---|---|
| t0_startpadlen | Var | blg | 29.9.03 |
| Description | | | |
| Length of the zero-padding at the start of t0_sendburst | | | |
| Interacts with | | Subscribers | |
| T algo | | koe | |

| Value | Unit | State/Min | Max | Quant |
|---|---|---|---|---|
| | B_samples | 0 | ca. 15 | 1 |

| Comment |
|---|
| t0_startpadlen = ceil((t_sendburstlen - t0_burstlen)/2) |

FIGURE 10AC

| Name | Type | Owner | Date |
|---|---|---|---|
| t1_startpadlen | Var | blg | 29.9.03 |
| Description | | | |
| Länge des Zero-Paddings am Start von t1_sendburst | | | |
| Interacts with | | Subscribers | |
| T algo | | koe | |

| Value | Unit | State/Min | Max | Quant |
|---|---|---|---|---|
| | B_samples | 0 | ca. 15 | 1 |

| Comment |
|---|
| t1_startpadlen = ceil((t_sendburstlen - t1_burstlen)/2) |

FIGURE 10AD

| Name | Type | Owner | Date |
|---|---|---|---|
| ta_dist | Var | blg | 27.9.03 |

| Description |||||
|---|---|---|---|---|
| Distance between the last T burst of an acquisition period and the triggering for generating the subsequent A burst |||||
| Interacts with |||| Subscribers |
| Tracking algorithm |||| shn, koe, fhf |
| Value | Unit | State/Min | Max | Quant |
|  | S_cycles | 1 | 131071 | 1 |
| Comment |||||
| must comply with: ta_dist + at_dist = t_burstperiod |||||

FIGURE 10AE

| Name | Type | Owner | Date |
|---|---|---|---|
| two_ants | Var | blg | 27.9.03 |

| Description |||||
|---|---|---|---|---|
| Bit for simultaneously selecting both transmit antennas in the transmitter |||||
| Interacts with |||| Subscribers |
| Transmitter HF unit |||| shn, olr |
| Value | Unit | State/Min | Max | Quant |
|  | - |  |  | 1 Bit |
| Comment |||||
| - two_ants==0: use the bit mask ant_choice_mask for selecting the transmit antenna<br>- two_ants==1: always transmit on both transmit antennas |||||

FIGURE 10AF

RECEIVE DEVICE AND METHOD FOR RECEIVING A RECEIVE SEQUENCE

CROSS-REFERENCE TO RELATED APPLICATIONS

This application is a continuation of copending International Application No. PCT/EP2005/013365, filed Dec. 13, 2005, which designated the United States and was not published in English.

TECHNICAL FIELD

The present invention relates to a receive device and a method for receiving as well to a communication device comprising a transmitter device and a receive device which may be employed, in particular, in digital communication systems as well as in localization systems for determining a transmitter location or for determining a time of arrival of a receive sequence within a receiver.

BACKGROUND

In order that a receiver may synchronize, within a digital transmission system, to a digital signal sent out by a transmitter, the transmitter will radiate a digital signal known to the receiver. It is the receiver's task to determine the precise TOA (time of arrival) of the signal sent.

To determine the time of arrival, the cross-correlated between the digital receive signal and the known digital transmit signal is calculated.

In localization systems, a transmitter also emits a digital signal which will be received by several receivers. The position of the transmitter may be determined from the signal's times of arrival at the receivers via a run-time measurement.

On account of multipath propagation, in particular, the time of arrival of a signal can be determined in an imprecise manner only. In communication systems, for example, this leads to synchronization errors, or, in localization systems, to erroneous positioning.

SUMMARY

According to an embodiment, a receive device for determining a location of a transmitter device may have: an evaluator formed to determine a first location of the transmitter device from a time of arrival of a first receive sequence, and a second location of the transmitter device from a time of arrival of a second receive sequence, the receive sequences corresponding to different transmitted transmit sequences of the transmit device; and a combiner formed to determine the location of the transmitter device from the first location and the second location.

According to another embodiment, a communication system may have: a receive device for determining a location of a transmitter device, having: an evaluator formed to determine a first location of the transmitter device from a time of arrival of a first receive sequence, and a second location of the transmitter device from a time of arrival of a second receive sequence, the receive sequences corresponding to different transmitted transmit sequences of the transmit device; and a combiner formed to determine the location of the transmitter device from the first location and the second location; and a transmit device having a transmitter for sending out a first transmit sequence and a second transmit sequence, the receive sequences corresponding to the transmit sequences transmitted.

According to another embodiment, a method for determining a location of a transmitter device may have the steps of: receiving a first time of arrival of a first receive sequence, and a second time of arrival of a second receive sequence, the receive sequences corresponding to different transmitted transmit sequences of the transmit device; determining a first location of the transmitter device from the time of arrival of the first receive sequence, and a second location of the transmitter device from the time of arrival of the second receive sequence; and determining the location of the transmitter device from the first and second locations.

According to another embodiment, a computer program may have a program code for performing, when the computer program runs on a computer, a method for determining a location of a transmitter device, wherein the method may have the steps of: receiving a first time of arrival of a first receive sequence, and a second time of arrival of a second receive sequence, the receive sequences corresponding to different transmitted transmit sequences of the transmit device; determining a first location of the transmitter device from the time of arrival of the first receive sequence, and a second location of the transmitter device from the time of arrival of the second receive sequence; and determining the location of the transmitter device from the first and second locations.

The present invention provides a receive device for determining a location of a transmitter device, comprising:

an evaluation means configured to determine a first location of the transmitter device from a time of arrival of a first receive sequence, and a second location of the transmitter device from a time of arrival of a second receive sequence, the receive sequences corresponding to transmitted transmit sequences of the transmit device; and a combiner configured to determine the location of the transmitter device from the first location and the second location.

The present invention further provides a method for determining a location of a transmitter device, comprising:

receiving a first time of arrival of a first receive sequence, and a second time of arrival of a second receive sequence, the receive sequences corresponding to transmit sequences of the transmit device which have been transmitted;

determining a first location of the transmitter device from the time of arrival of the first receive sequence, and a second location of the transmitter device from the time of arrival of the second receive sequence; and determining the location of the transmitter device from the first and second locations.

The invention further provides a receive means comprising:

a receiver configured to receive a first receive sequence and a second receive sequence, each of the receive sequences comprising a plurality of successive values, and the successive values of the first receive sequence differing from the successive values of the second receive sequence;

a correlator configured to determine a first time of arrival of the first receive sequence, and a second time of arrival of the second receive sequence; and a combination means configured to determine an averaged time of arrival from the first and second times of arrival.

The inventive receive device as well as the inventive receive method may be advantageously employed in a receiver system for determining a location of a transmit device, as well as in a communication system.

When the transmitter emits a burst via an antenna, this would typically lead, due to multipath propagation, to a systematic error in the estimation of the time of arrival of the burst in the receiver. In this case, the error depends on the location of the transmitter, on the orientation of its antenna, and on the burst used.

Since multipath propagation leads to a frequency-selective channel, the estimated and erroneous time of arrival actually also depends on the burst used. If a different burst having different spectral properties is transmitted, the systematic time-of-arrival error will also change. Also, this error will change if a different transmit antenna is used instead of a first transmit antenna, since in this case a different multipath propagation will result, i.e. a different transmission channel will be used.

This results from the fact that—depending on where the transmit antenna currently has aligned its main lobe of the direction characteristic—sometimes there will be more, and sometimes fewer, multipath phenomena.

The present invention is based on the findings that an influence of the multipath propagation in determining the time of arrival of a receive sequence may be statistically reduced in that more than one transmit signal, also referred to as burst below, is used in the transmitter, the transmit signals used being specified by a predefined multiplex scheme. Each transmit signal exhibits a different time signal and a different spectrum. Alternatively, more than one transmit antenna may be used, only one antenna being used at any one point in time, or both antennas transmitting at the same time. A multiplex scheme may also determine the manner of switching between the antennas.

In this manner, a waveform diversity, or a transmit-antenna diversity, is achieved. The basic principle of diversity is that the same information, for example the transmitter location, is obtained via many mutually independent paths, i.e. different burst pairs or different pairs of transmit antennas, this information being corrupted in different ways on each path from the transmitter to the receiver, i.e. there being a systematic error of the time of arrival. By combining the corrupted information, for example by averaging the estimated, corrupted transmitter locations, the original information may be obtained with an error which on average, averaged over all potential locations, is smaller than the information received on the individual paths. For a localization system, a different systematic time-of-arrival error is obtained for each transmitter location as a function of the selected pair of specific burst and transmit antennas. Some burst pairs, or pairs of transmit antennas, are optimal for specific locations, i.e. they result in the smallest systematic error. However, at other transmitter locations they may possibly result in very large systematic errors. At these locations, other burst pairs, or pairs of transmit antennas, would result in smaller systematic errors.

In accordance with one embodiment, the bursts received are weighted with quality values in the receiver before they are used for determining the averaged time of arrival. In this manner, the faulty influence of disturbed receive sequences in calculating the averaged time of arrival is reduced.

BRIEF DESCRIPTION OF THE DRAWINGS

Embodiments of the present invention will be detailed subsequently referring to the appended drawings, in which:

FIGS. 10a-10af are definitions of variables used in one embodiment; and

DETAILED DESCRIPTION

Figure 1:
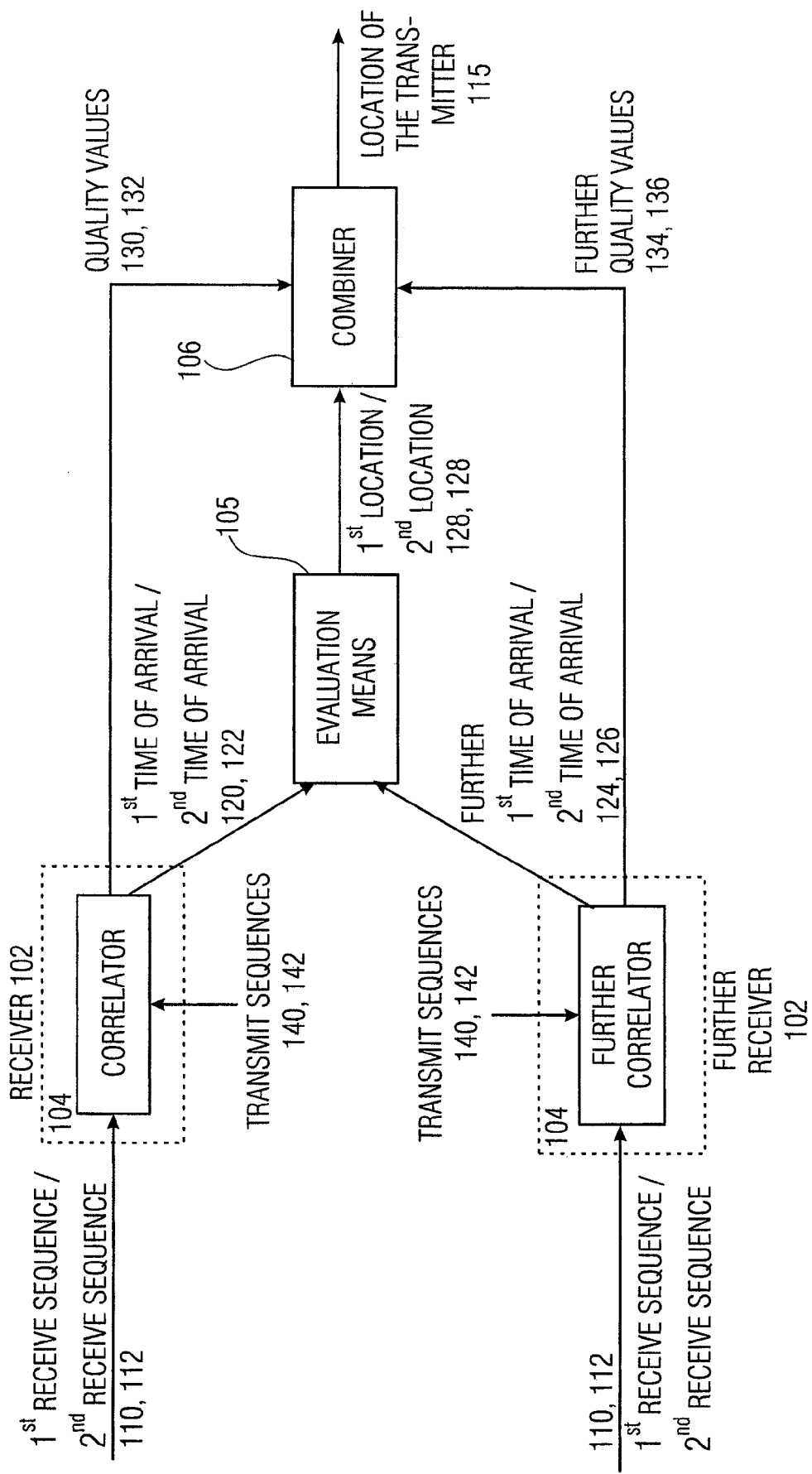
FIG. 1 is a block diagram of a receive device in accordance with the present invention.

In the following description of the embodiments of the present invention, identical or similar reference numerals will be used for those elements depicted in the various drawings which have similar actions, repeated descriptions of these elements being dispensed with.

FIG. 1 shows a block diagram of a receive device for determining a location of a transmitter device in accordance with an embodiment of the present invention. The receive device is configured to receive a first receive sequence and a second receive sequence 110, 112. The receive sequences 110, 112 are transmit sequences sent out by a transmit device (not shown in FIG. 1). The receive device is configured to determine the location 115 of the transmitter. In accordance with this embodiment, the receive device comprises two receivers 102, each having correlators 104. In addition, the receive device comprises an evaluation means 105 and a combiner 106. The receivers 102 are configured to receive the receive sequences 110, 112 and to determine times of arrival 120, 122, 124, 126 of the receive sequences. To this end, correlators 104 are configured to receive the transmit sequences 140, 142 which are sent out by the transmit device and correspond to receive sequences 110, 112. Receiver 102 is configured to determine the first time of arrival 120 of the first receive sequence, and the second time of arrival 122 of the second receive sequence 112, and to provide them to evaluation means 105. The further receiver 102 is configured to determine the further first time of arrival 124 of the first receive sequence 110 in the further receiver, and the further second time of arrival 126 of the second receive sequence 112 in the further receiver, and to provide them to evaluation means 105.

Evaluation means 105 is configured to determine, from the first time of arrival 120 and from the further first time of arrival 124, a first location 128 of the transmit device, and to provide same to the combiner 106. In addition, evaluation means 105 is configured to determine, from the second time of arrival 122 and from the further second time of arrival 126, a second location 129 of the transmit device, and to provide same to the combiner 106. The combiner 106 is configured to determine the location 115 of the transmit device from the first location 128 and the second location 129. To this end, the combiner may be configured to perform an averaging of the locations 128, 129.

Depending on the field of application, the receive device may comprise a single receiver 102, or a plurality of receivers 102, which provide first times of arrival and second times of arrival to evaluation means 105. If the inventive receive device is combined with known receivers, the receive device may consist only of the evaluation means and the combiner 106, evaluation means 105 being configured to obtain the information about the times of arrival from the receivers employed. Evaluation means 105 may determine the locations 128, 129 via run-time analyses. Location information 128, 129 may be present in the form of values standardized accordingly, for example in the form of coordinates, and may be processed further.

The algorithm used in the receive device consists in that both times of arrival are passed on, from the receivers, to a central computer which is depicted in FIG. 1 by the evaluation means and the combiner. Subsequently, a first transmitter location is determined from the first times of arrival associated with the first transmit sequence, or receive sequence, of all receivers, and subsequently, a second transmitter location is determined from the second times of arrival associated with the second transmit sequence, or the second receive sequence, of all receivers. Subsequently, averaging is performed over the locations determined. Thus, locations averaged are calculated in the central computer.

Receive sequences 110, 112 may be bursts which have been transmitted from one transmitter to the receivers 102 via a transmission channel. The transmission channel may be a line-conducted or a wireless transmission channel.

The receivers 102 may be an antenna unit configured to determine the digital information, in the form of the receive sequences received, from the receive sequences 110, 112 sent via the transmission channel.

The receiver 102 or, alternatively, the correlator 104 may be configured to determine quality values 130, 132, 134, 136 which represent a quality of the receive sequences 110, 112, or of times of arrival 120, 122, 124, 126. Quality values 130, 132, 134, 136 indicate the current influence of the multipath propagation on the times of arrival 120, 122, 124, 126, i.e. are quality values of the estimated times of arrival with regard to the corruption caused by multipath propagation. In accordance with one embodiment, the quality values calculated in the receive device are an estimated signal/noise ratio, also referred to as SNIR, of the receive sequences 110, 112. Alternatively, quality values 130, 132, 134, 136 may be a parameter which characterizes the multipath influence. Due to the diversity, i.e. due to the different receive sequences 110, 112, the first time of arrival 120, 124 and the second time of arrival 122, 126 have different quality values.

In accordance with one embodiment, only those times of arrival which have high quality values will continue to be used in the receiver. Alternatively, the quality values are taken into account in the combiner, via a weighting, in the calculation of the averaged location 115. This means that the weighting coefficient depends on quality values 130, 132, 134, 136. The higher the quality of the receive sequences 110, 112, or of the times of arrival 120, 122, 124, 126 determined therefrom, the higher the weighting will be in an averaging for determining the averaged location 115.

The averaged location 115 may be derived from arithmetic averaging from the locations 128, 129. If quality values 130, 132, 134, 136 are taken into account in determining the averaged location 115, the determination of the averaged location 115 may be established from an arithmetic averaging from the weighted locations 128, 129. To this end, the first time of arrival 120, 124 may be weighted with the first quality value 130, 134, and the second time of arrival 122, 126 may be weighted with the second quality value 132, 136.

In accordance with this embodiment, the correlator 104 is configured to determine the times of arrival 120, 122 by correlating the received receive sequences with transmit sequences 140, 142. The transmit sequences 140, 142 correspond to transmit sequences which are sent out by a transmit device (not shown in FIG. 1), and are received, after the transmission, by the receive device 110 as receive sequences 110, 112, and are provided to the correlator 104 as received receive sequences by the receiver 102.

If the first receive sequence 110 and the second receive sequence 112 are receive sequences which differ only in that an underlying transmit sequence was sent out via a first antenna for the first receive sequence 110 and via a second transmit antenna for the second receive sequence 112, the correlator 104 may perform a successive correlation of the received receive sequences with a transmit sequence. However, if the receive sequences 110, 112 are receive sequences which have emerged from different transmit sequences, the correlator 104 will perform a correlation of the received receive sequences both with the first transmit sequence 140 and with the second transmit sequence 142. When utilizing a multiplex scheme, a correlation of the receive sequence with the two transmit sequences is not necessary, since, first of all, a synchronization to the multiplex scheme is performed, and thereafter a correlation with the correct transmit sequence is performed. In accordance with one embodiment, the receive device 100 comprises a control unit (not shown in the figures) which may synchronize to a multiplex scheme employed by the transmitter. In this context, the multiplex scheme indicates a succession of the transmit sequences used and, thus, a succession of the receive sequences 110, 112. A synchronization may be performed by specific preambles or by other measures. For example, the receive device may be configured to provide—in response to a reception of a synchronization sequence, for example of the specific preamble—the first transmit sequence 140 and the second transmit sequence 142 to the correlator 104 in a predefined succession.

In this and the following embodiments, the averaged location 115 is determined from a first receive sequence 110 and a second receive sequence 112. Utilization of more than two receive sequences, or of more than two transmit antennas, is possible. This is advantageous, since it results in a larger diversity.

Figure 2:
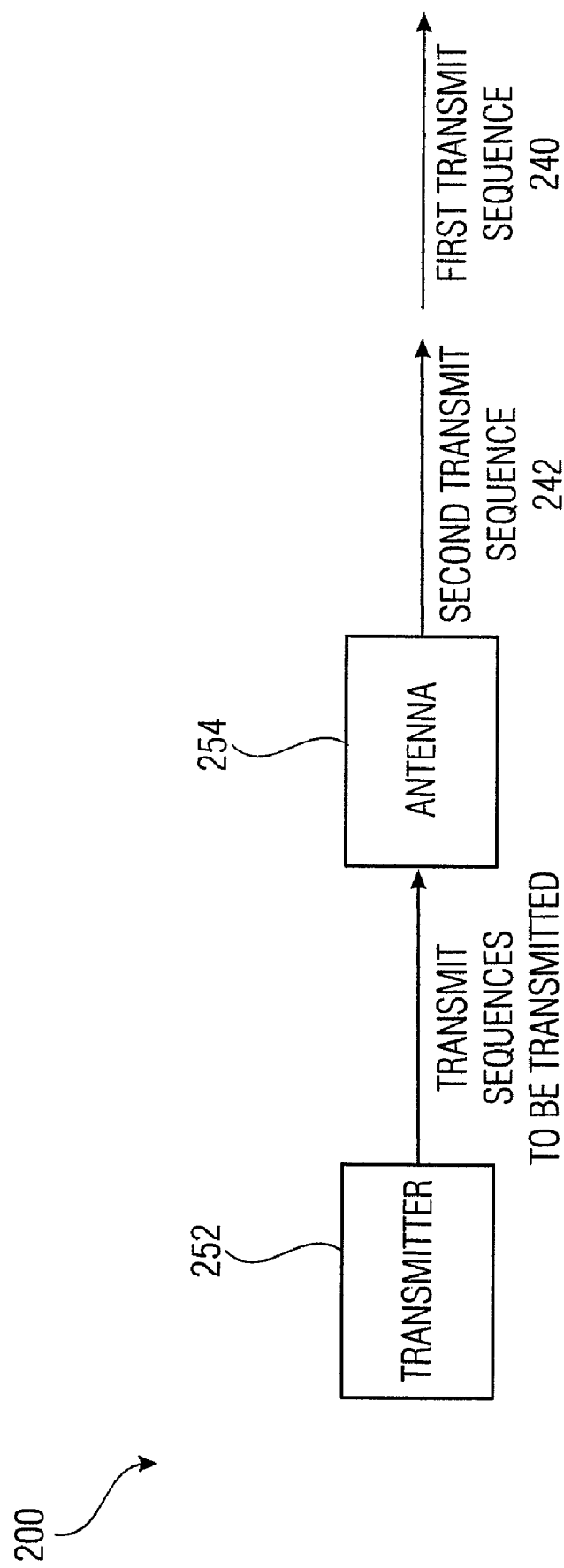
FIGS. 2 and 3 are block diagrams of transmitter devices in accordance with embodiments of the present invention.

FIG. 2 shows a block diagram of a transmit device 200 which may be utilized in combination with the receiver device depicted in FIG. 1. The transmit device 200 is configured to send out a first transmit sequence 240 and a second transmit sequence 242. For this purpose, the transmit device 200 comprises a transmitter 252 and an antenna 254. The transmitter 252 is configured to provide to-be-transmitted transmit sequences to antenna 254 and to send them out via same. Transmit sequences 240, 242 are transmitted to the receive device via the transmission channel. In accordance with this embodiment, the first transmit sequence 240 and the second transmit sequence 242 are transmitted in temporal succession. To achieve greater diversity, the transmit sequences 240, 242 are bursts having different spectral properties. This means that transmit sequences 240, 242 consist of different value sequences, for example, or are emitted at different frequencies.

Figure 3:
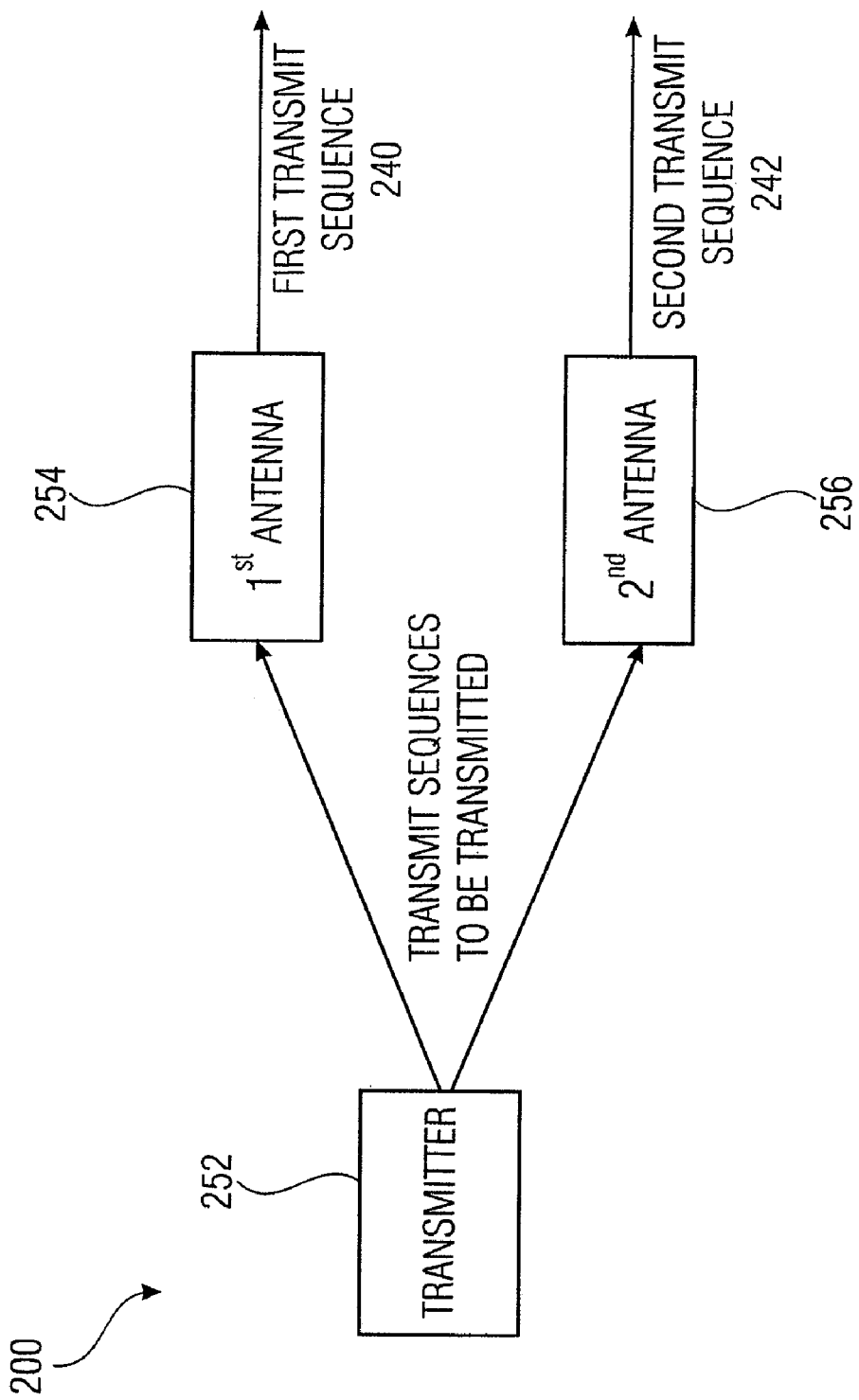

FIG. 3 shows a block diagram of a further transmit device 200 which may also be used in combination with the receiver device depicted in FIG. 1. Unlike the transmit device depicted in FIG. 2, the transmit device 200 depicted in FIG. 3 exhibits a first antenna 254 and a second antenna 256. Transmitter 252 is configured to send out the to-be-sent transmit sequences both via the first antenna 254 and via the second antenna 256. In accordance with this embodiment, the first transmit sequence 240 is sent out via the first antenna 254, and the second transmit sequence 242 is sent out via the second antenna 256. The transmit sequences 240, 242 may be identical, since an antenna diversity is ensured on account of the two antennas 254, 256. To this end, antennas 254, 256 may be antennas having different characteristics, or identical antennas having different orientations of the main lobe, or different positions, possibly with identical orientations. In this manner, antenna diversity is achieved.

For a communication system, the receive device depicted in FIG. 1 may be combined with one of the transmit devices 200 depicted in FIGS. 2 and 3. The times of arrival may advantageously be used to perform a synchronization between the receive device and the transmit device 200.

Depending on the transmit device 200, an antenna diversity or waveform diversity, i.e. burst diversity, may be exploited, or a combination of an antenna diversity and waveform diversity may be exploited. The pattern of the burst pairs, or pairs of transmit antennas, in exploiting two different bursts, or two different transmit antennas, respectively, may be selected arbitrarily. For example, for a specified first transmit antenna, a first burst and a second burst may be transmitted in an alternating manner, or a first burst may be transmitted twice via the first antenna, in each case, and then the second burst may be transmitted twice via the second antenna, in each case. The underlying pattern may be freely programmable. In the receive device, the pattern of the bursts must be known, since here a cross-correlation must be performed with the respectively correct bursts transmitted. A synchronization to the pattern selected may be performed in that a synchronization burst is detected which is followed by the same programmed pattern. The transmit-antenna pattern may be ignored by the receiver.

In the transmit-antenna diversity, the transmit antennas may transmit at the same time or in a time-multiplexed manner.

In the following, such possible transmit pulses, i.e. bursts or waveforms, will be depicted which may be exploited, in accordance with the inventive approach, for estimating the time of arrival of the transmit pulses in the receive device.

RRC003 describes a root raised cosine transmit pulse former with a roll-off of 0.03. The crest factor for this waveform amounts to 8 dB for real signals, and to 7 dB for complex-valued signals.

RRC024 designates a root raised cosine transmit pulse former with a roll-off of 0.24. The crest factor amounts to 5 dB for real signals, and to 4.3 dB for complex-valued signals.

RRC10 designates a root raised cosine transmit pulse former with a roll-off of 1.0. The crest factor amounts to 3.6 dB for real signals, and to 3.4 dB for complex-valued signals.

Gauss054 designates a softly band-limited Gauss pulse with a normalized bandwidth of 0.54. The crest factor amounts to 1.9 dB for real signals and to 1.8 dB for complex-valued signals.

FIGS. 4a to 4f, 5a to 5f, 6a to 6f, 7a to 7f show the envelopes of the time-of-arrival estimation error, i.e. of the estimation error of the time of arrival of a waveform in a receive device in a two-way transmission characterized as follows:

Exactly two Dirac-shaped paths are received.

The second path is attenuated relative to the first path by the constant factor of "attenuation", i.e. the channel is time-invariant, i.e. does not fade. The attenuation value in dB in indicated in the header of each figure, the values of 0 dB, i.e. two equally strong paths, 6 dB and 10 dB being examined. With regard to the two latter values, the first path to arrive will be dominant.

The delay between the two paths is varied from 1 ns to 80 ns on the x axis of the figures.

The constant phase difference between the two paths (indicated in the figures as phase) is varied from 0 degrees to 180 degrees in steps of 30 degrees. This family of curves results in the envelope.

No thermal noise is added in the transmission, i.e. the signal/noise ratio is extremely high.

The y axis of each image reflects the determined estimation error for the TOA (time of arrival) in ps for the configuration examined in each case. That value which would be determined, in the transmission via a one-way channel, if only the first of the two paths were present, is regarded as an ideal TOA.

In two successive images, respectively, the errors for two different methods of the TOA estimation are depicted. At first, the result of a so-called inflection-point method is shown, wherein the TOA is determined from the position of the inflection point of the left-hand edge at the first clear peak. The second image, respectively, shows the results for a so-called maximum method, wherein from the maximum of the first clear peak the TOA is determined. The method examined in the image may be seen from the header.

The first clear peak is the first peak whose magnitude is larger than a predefined value of peakthresh with regard to the maximum magnitude of the correlation. For certain waveforms and certain constellations, this may be the main peak, for others it is possibly the left-hand secondary ripple, it being possible for the selection of the left-hand secondary ripple to be advantageous in specific waveforms within the estimation algorithm. In the event of a misestimation, the algorithm may erroneously also find a left-hand or a right-hand secondary ripple of the correlation function. In the figures, this may be recognized as a very large TOA error which often, but not always, decreases abruptly in the event of larger delays. As a rule, the peakthresh is ½, but may be varied, as the case may be. Its value is contained in the header line of each figure.

The illustrations with regard to FIGS. 4 to 7 will be specified below with reference to FIGS. 4A-4F. FIGS. 4a to 4f relate to the RRC003 waveform.

Figure 4A:
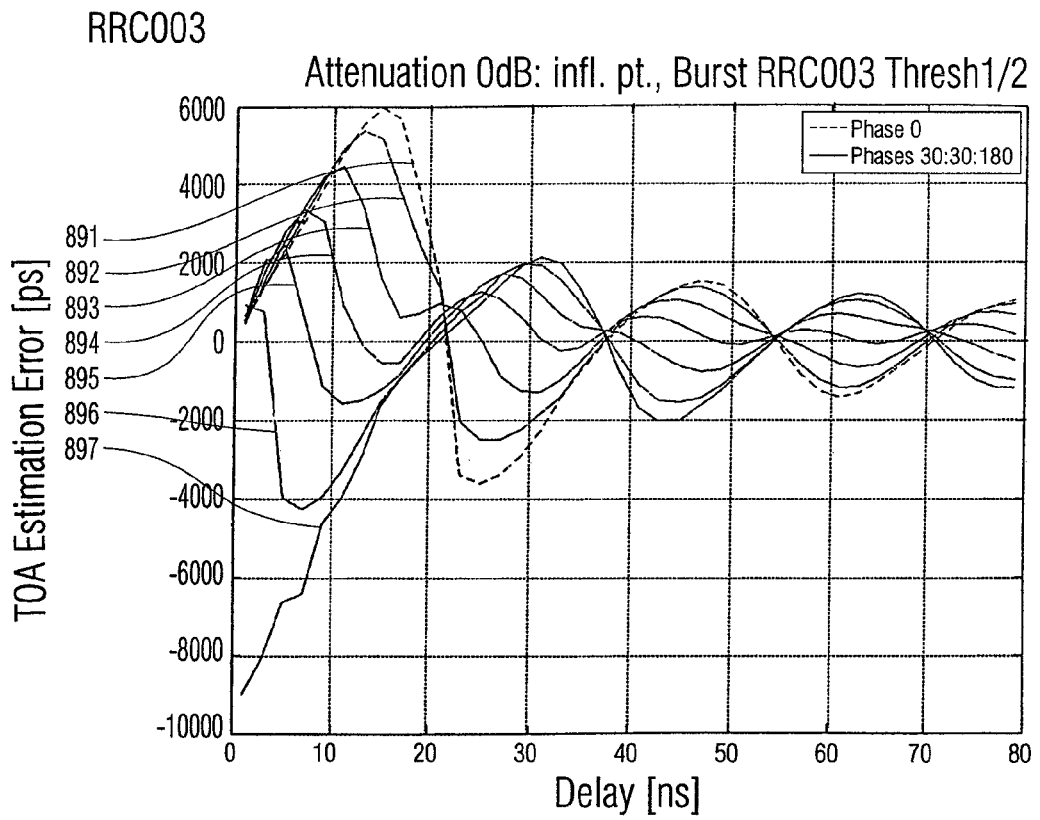
FIGS. 4a-4f to 7a-7f are graphic representations of an estimation error of the times of arrival of different receive sequences in accordance with embodiments of the present invention.

In FIG. 4A, the delay is indicated in ns on the x axis, and the TOA estimation error is indicated in ps on the y axis.

The attenuation is 0 dB, the inflection-point method is utilized for determining the time of arrival, and the peakthresh is ½. Curve 891 represents a phase difference of 0 degrees. Curve 892 represents a phase difference of 30 degrees, curve 893 a phase difference of 60 degrees, curve 894 a phase difference of 90 degrees, curve 895 a phase difference of 120 degrees, curve 896 a phase difference of 150 degrees, and curve 897 a phase difference of 180 degrees. Thus, curves 891 and 897 represent the envelopes of the TOA estimation error.

Figure 4B:
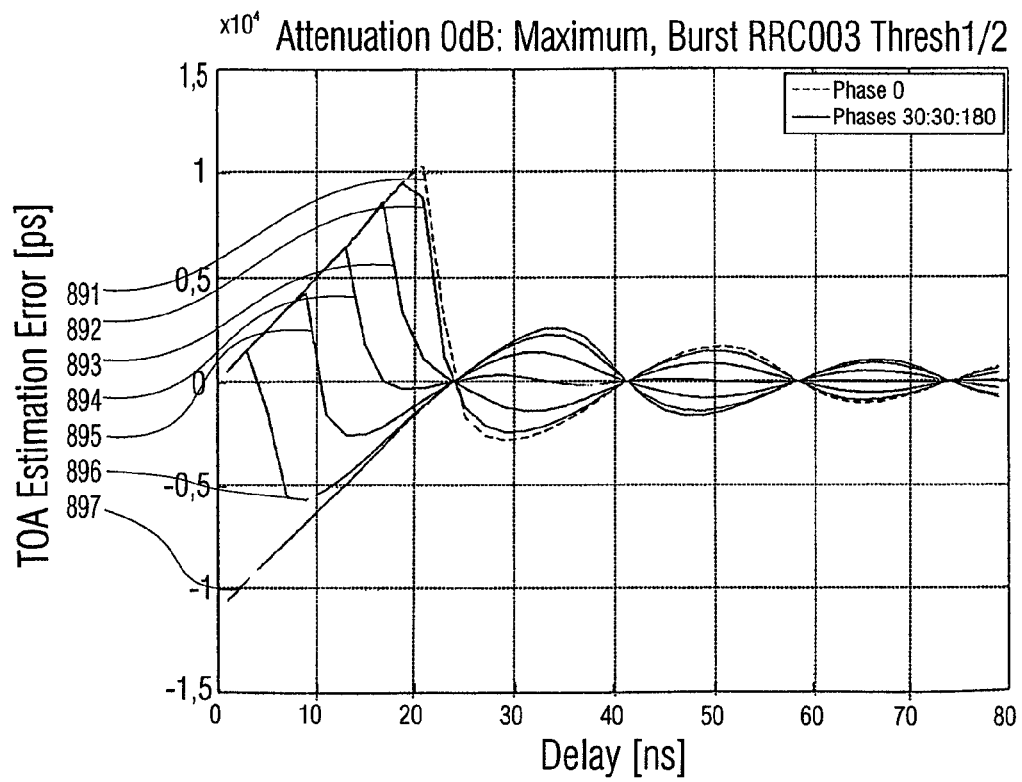

FIG. 4B corresponds to the representation depicted in FIG. 4A, the maximum method being used for determining the TOA.

Figure 4C:
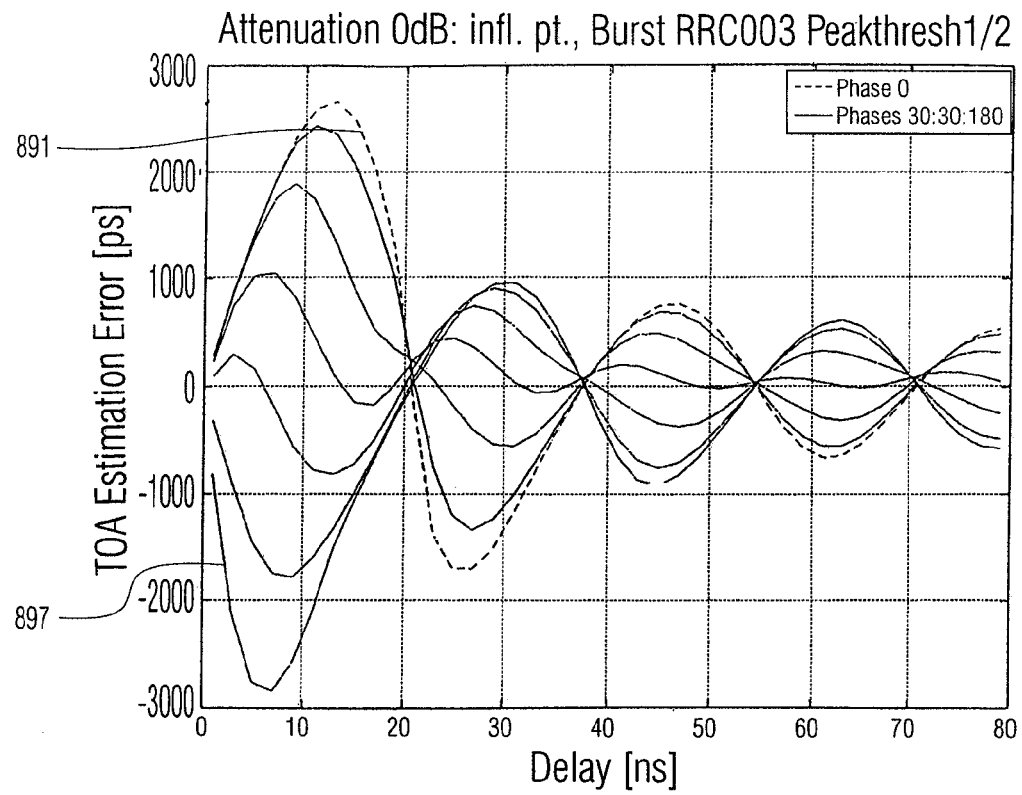
Figure 4D:
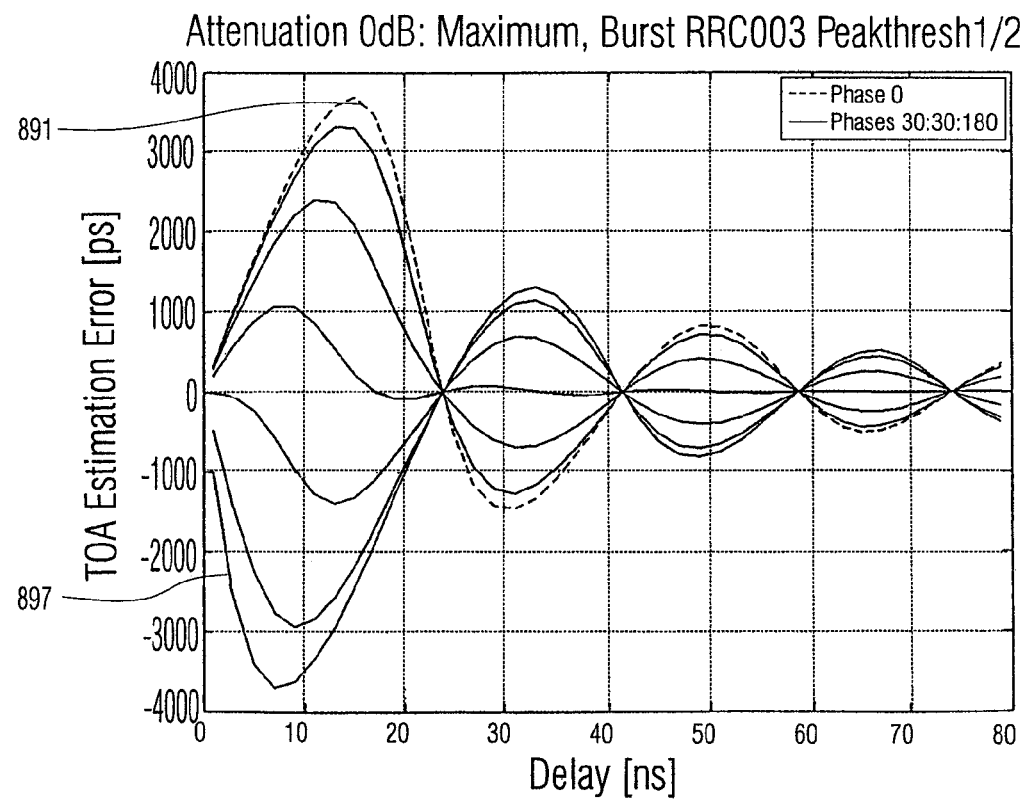
Figure 4E:
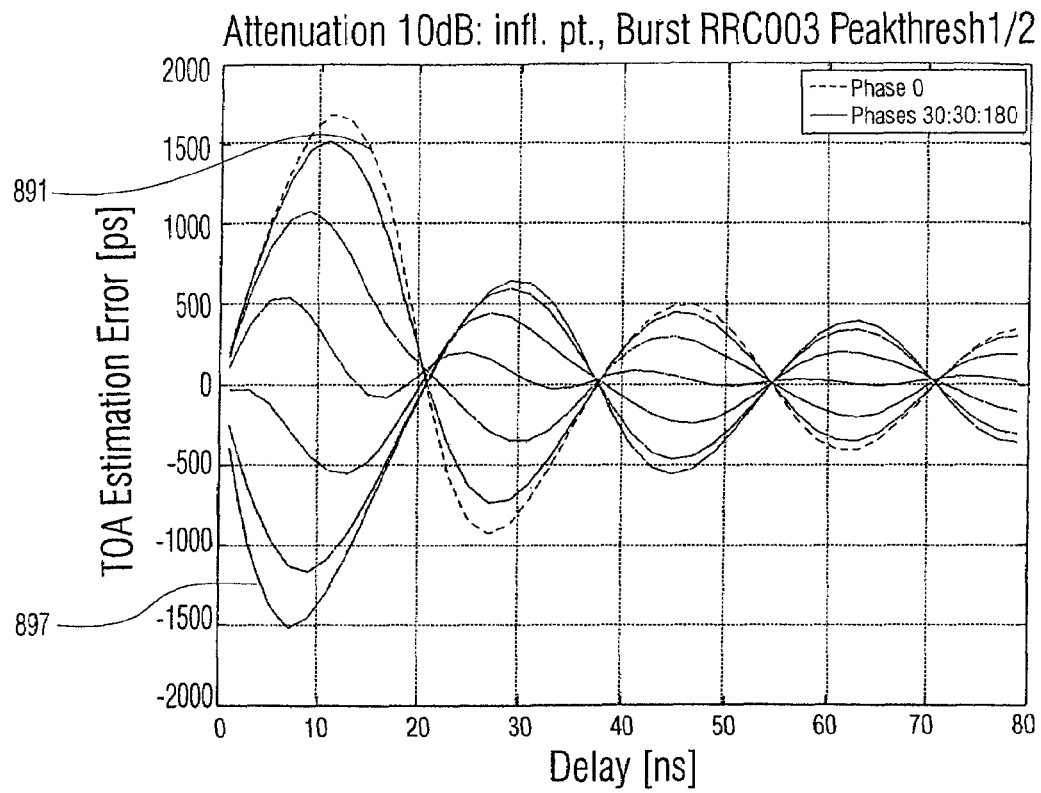
Figure 4F:
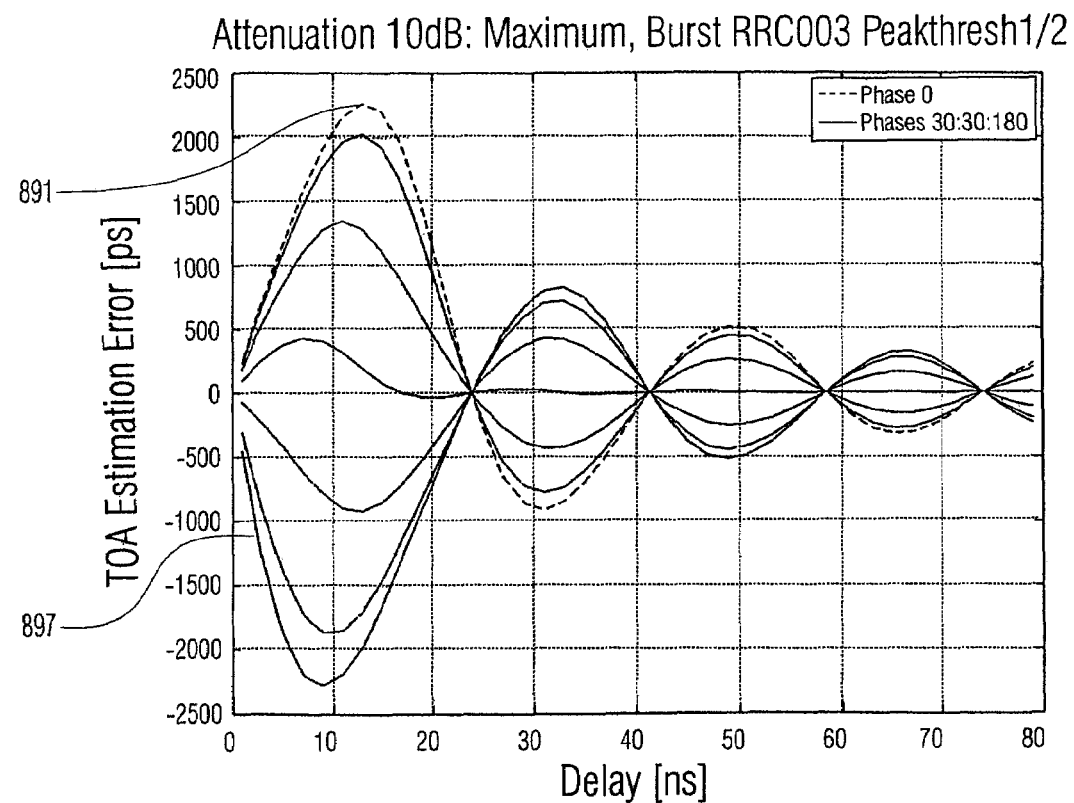
Figure 5A:
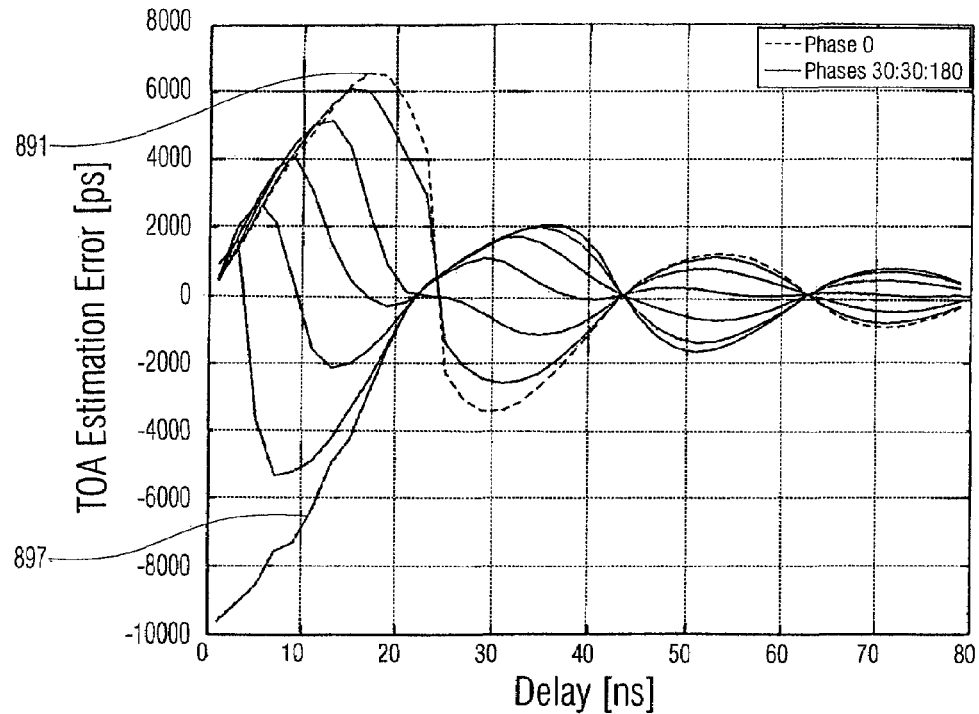
Figure 5B:
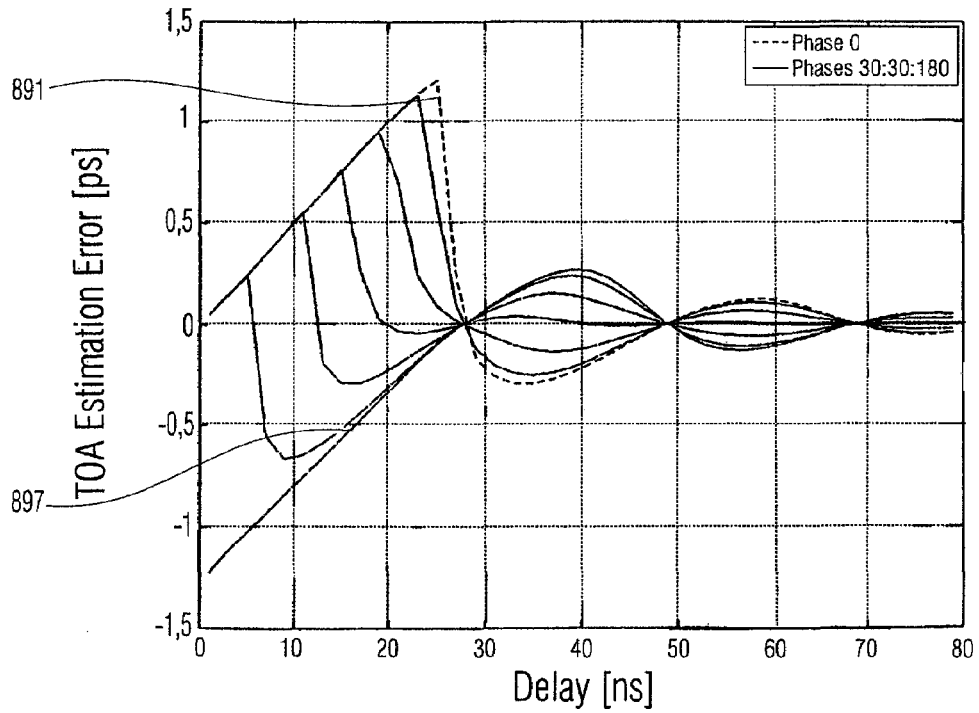
Figure 5C:
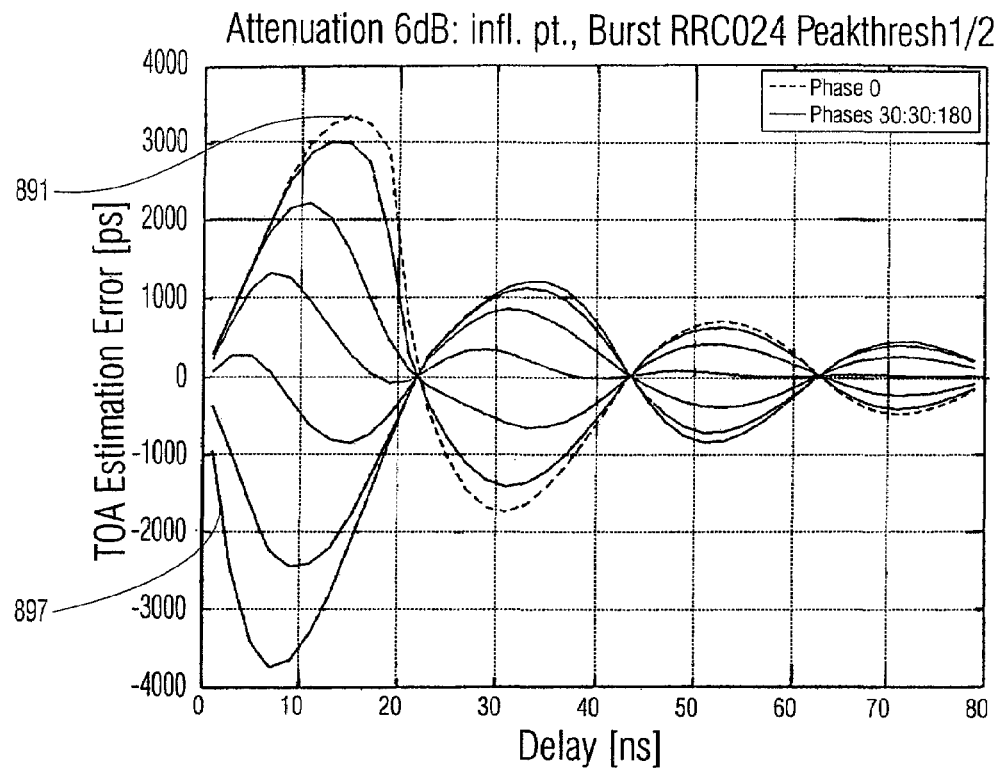
Figure 5D:
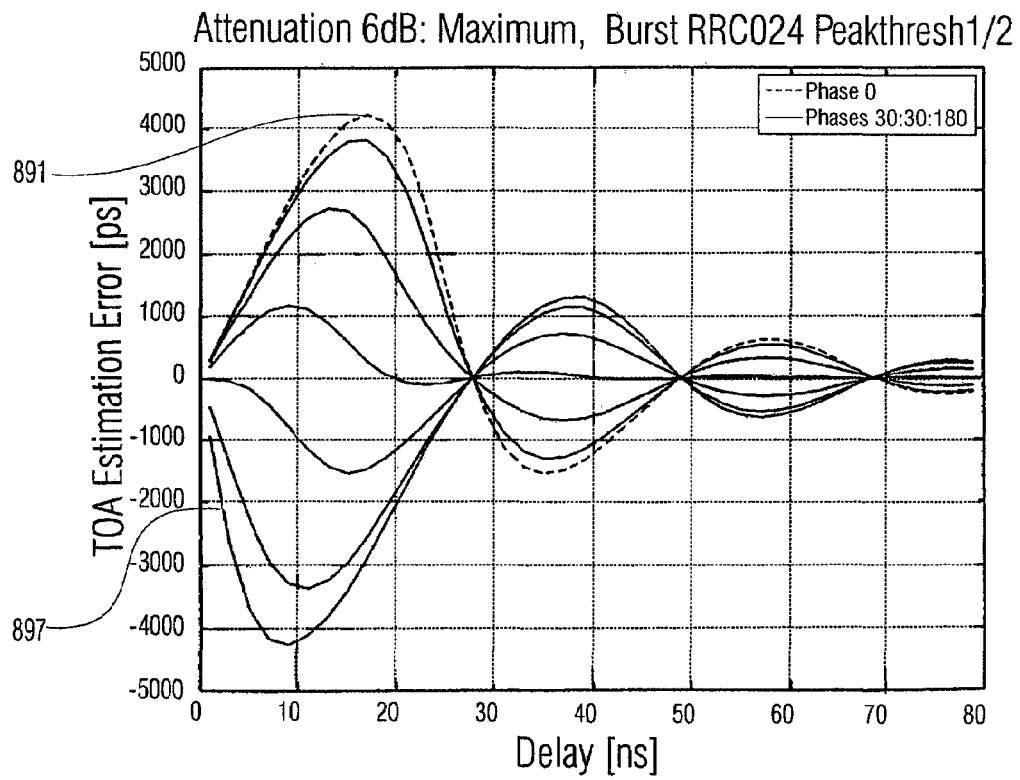
Figure 5E:
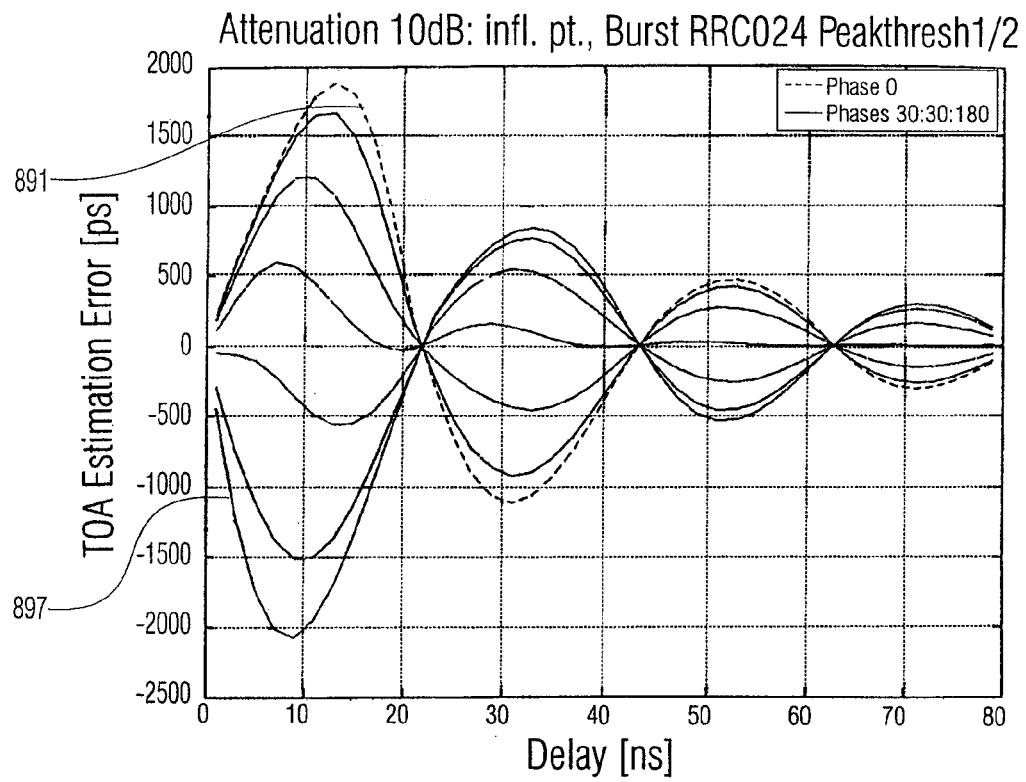
Figure 5F:
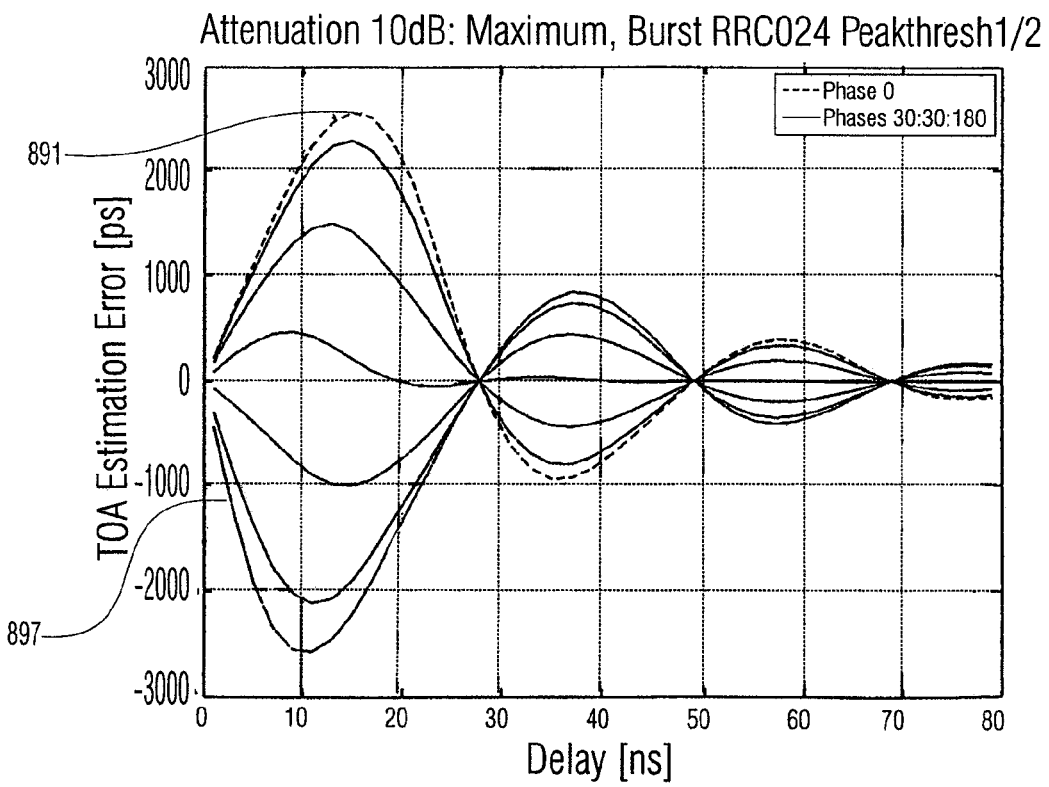
Figure 6A:
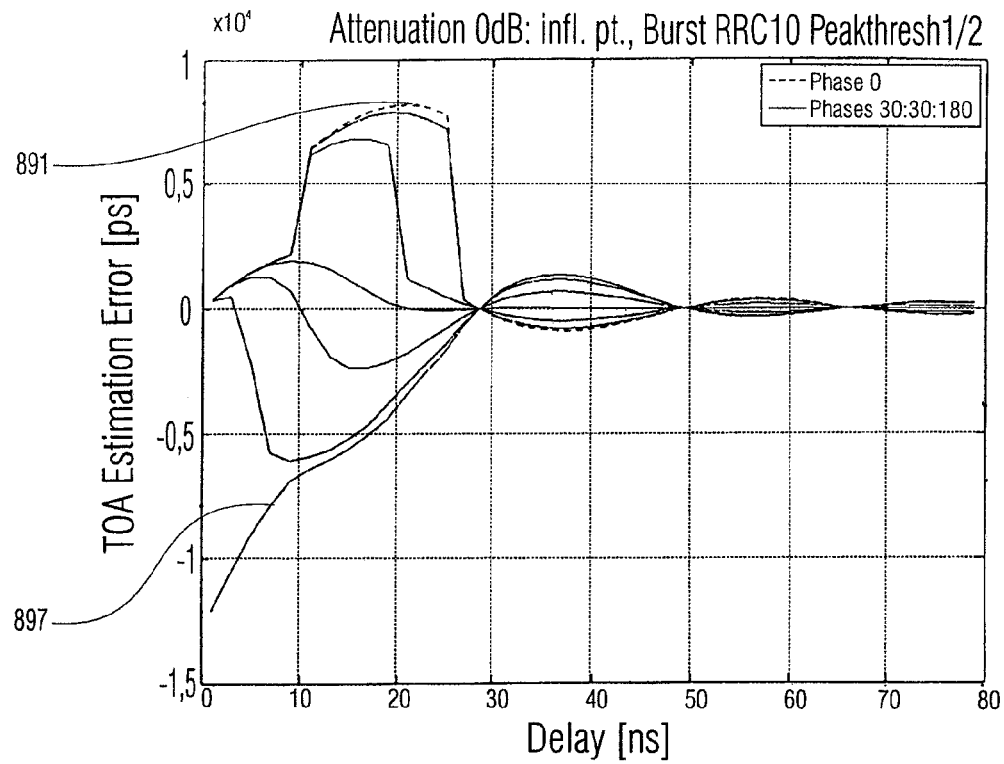
Figure 6B:
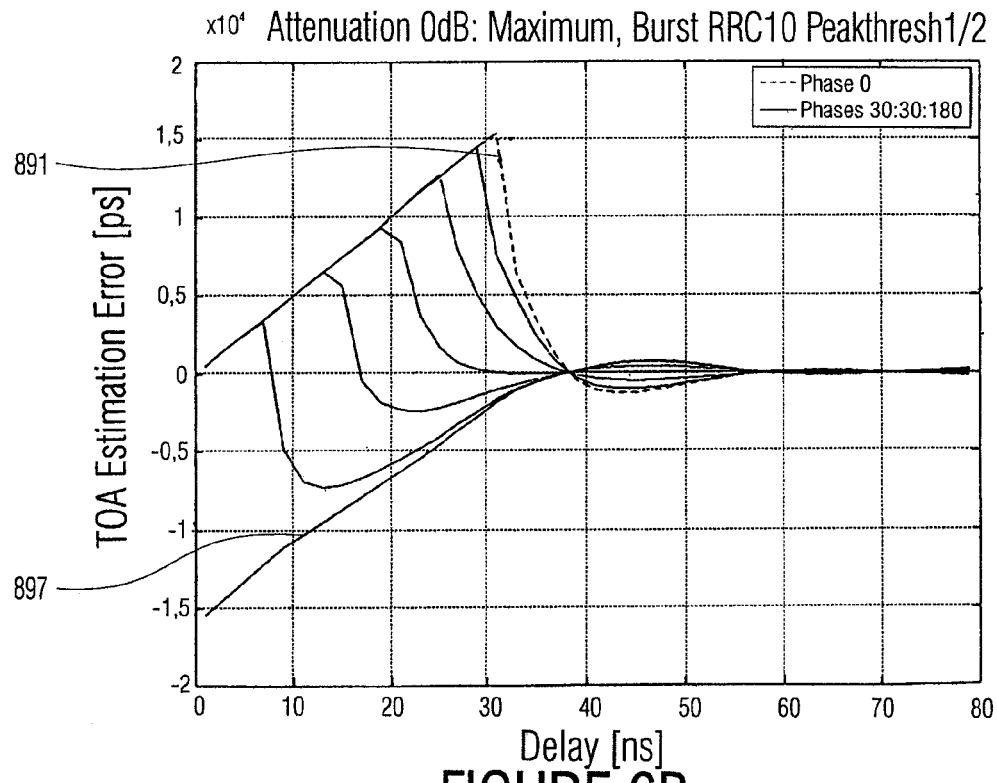
Figure 6C:
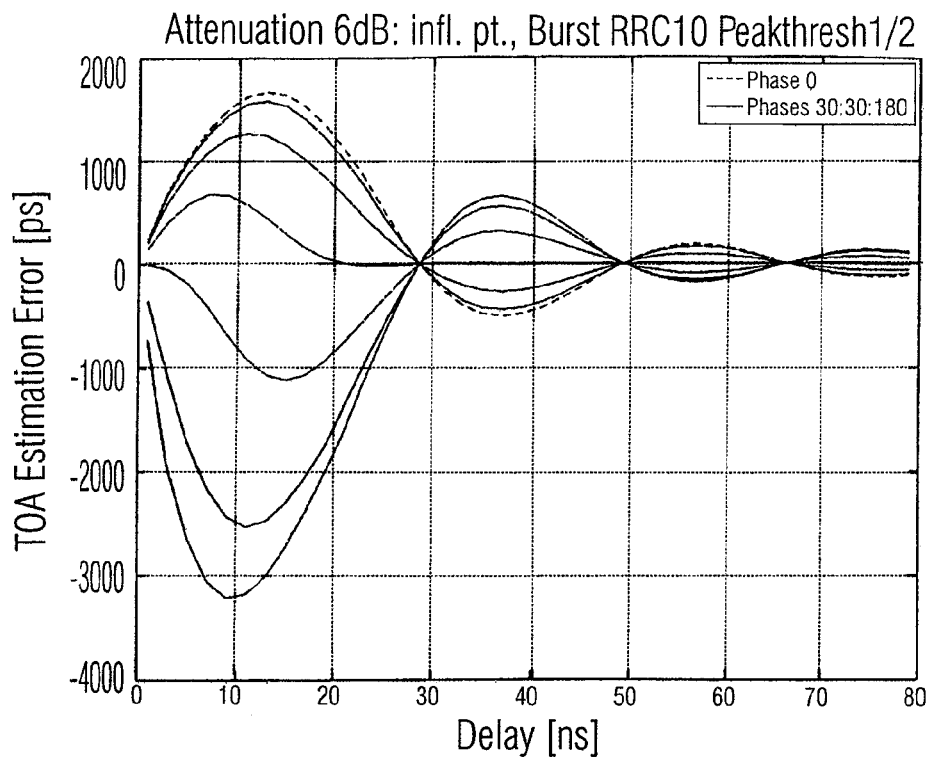
Figure 6D:
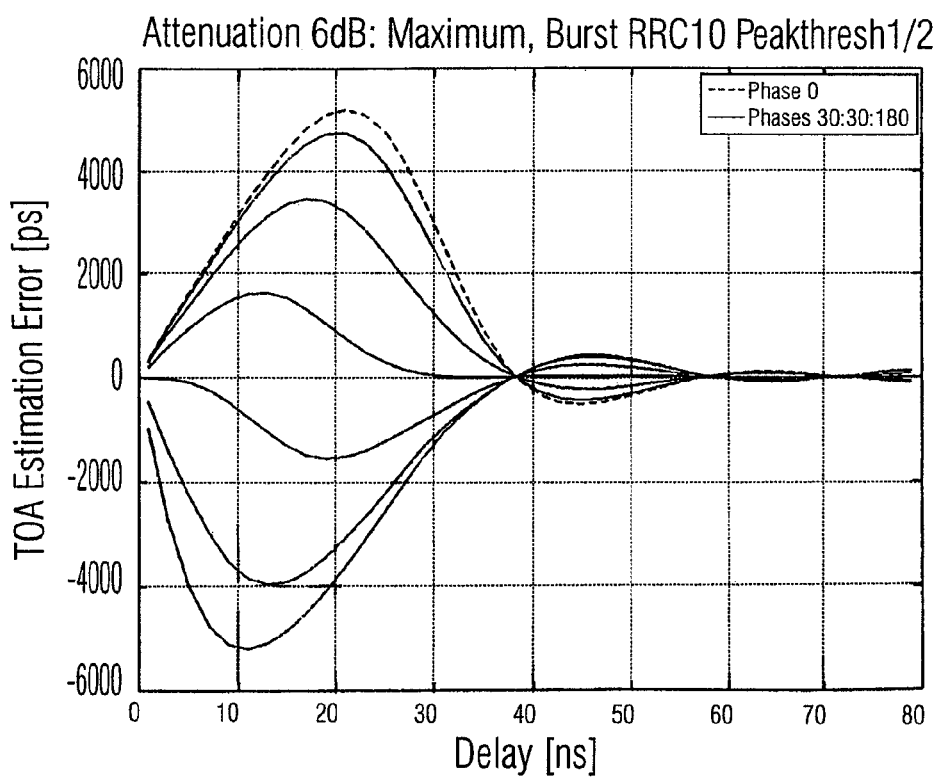
Figure 6E:
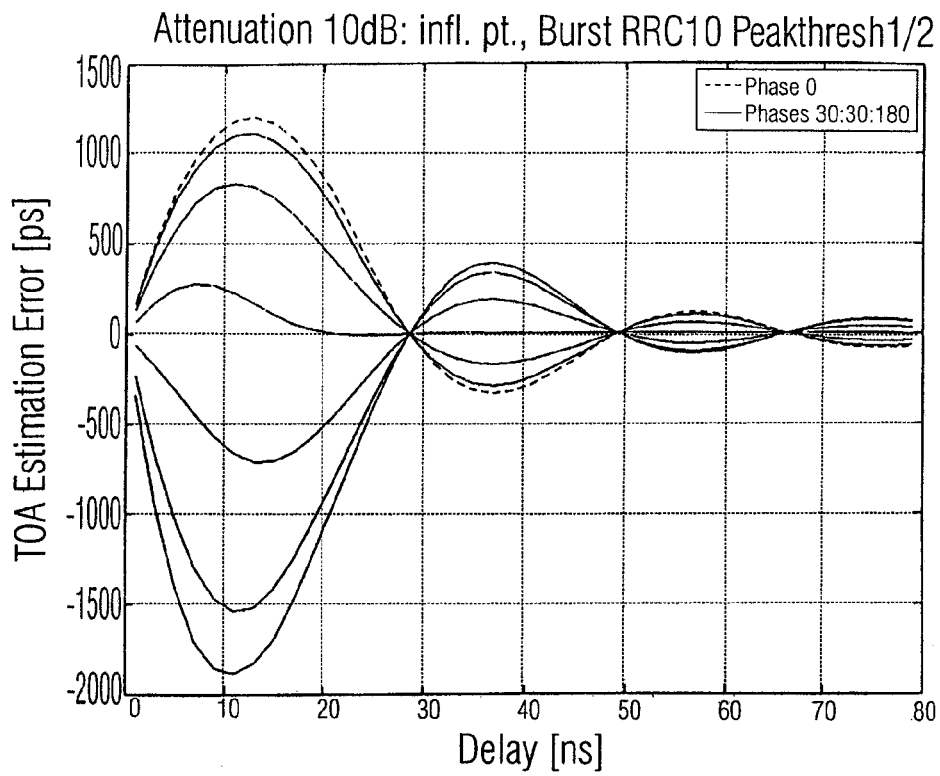
Figure 6F:
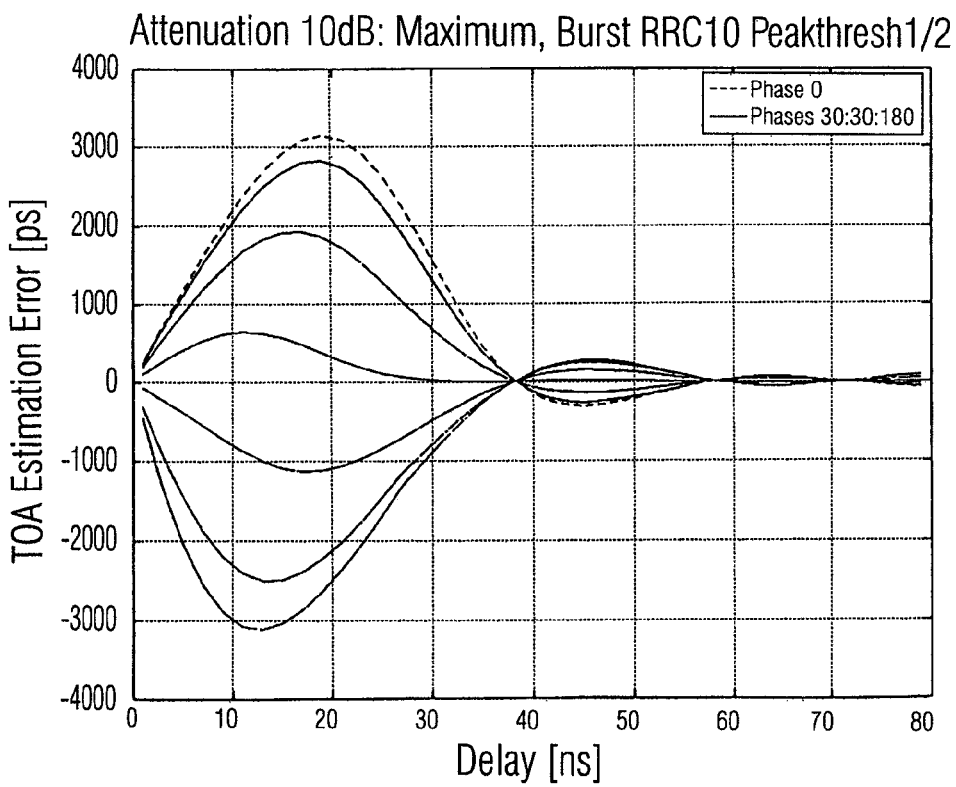
Figure 7A:
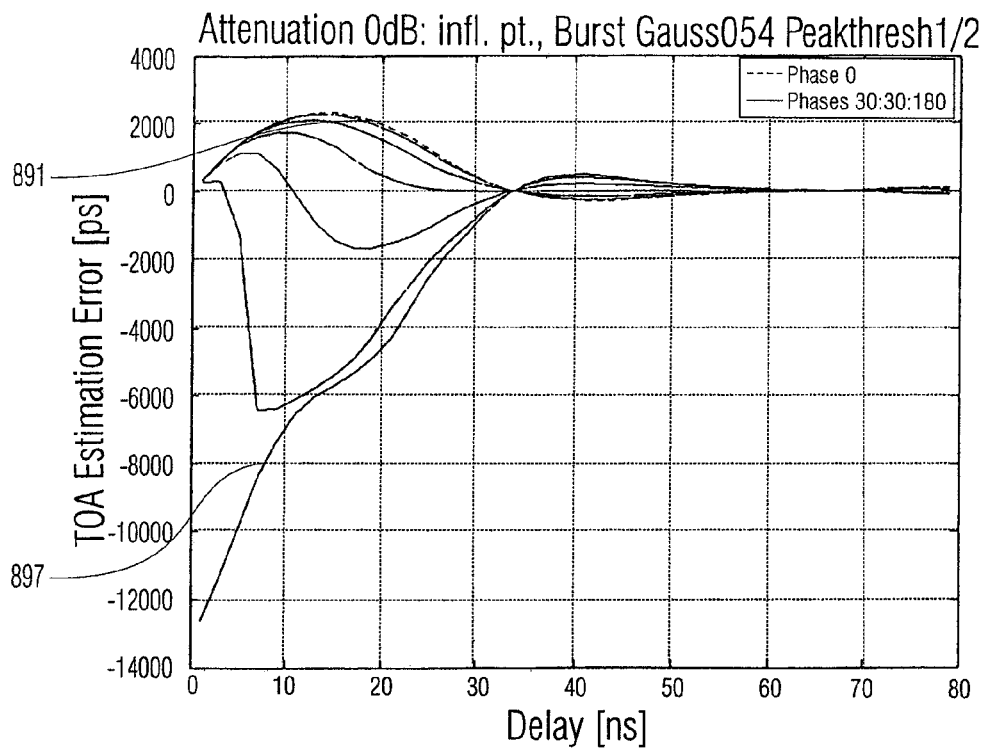
Figure 7B:
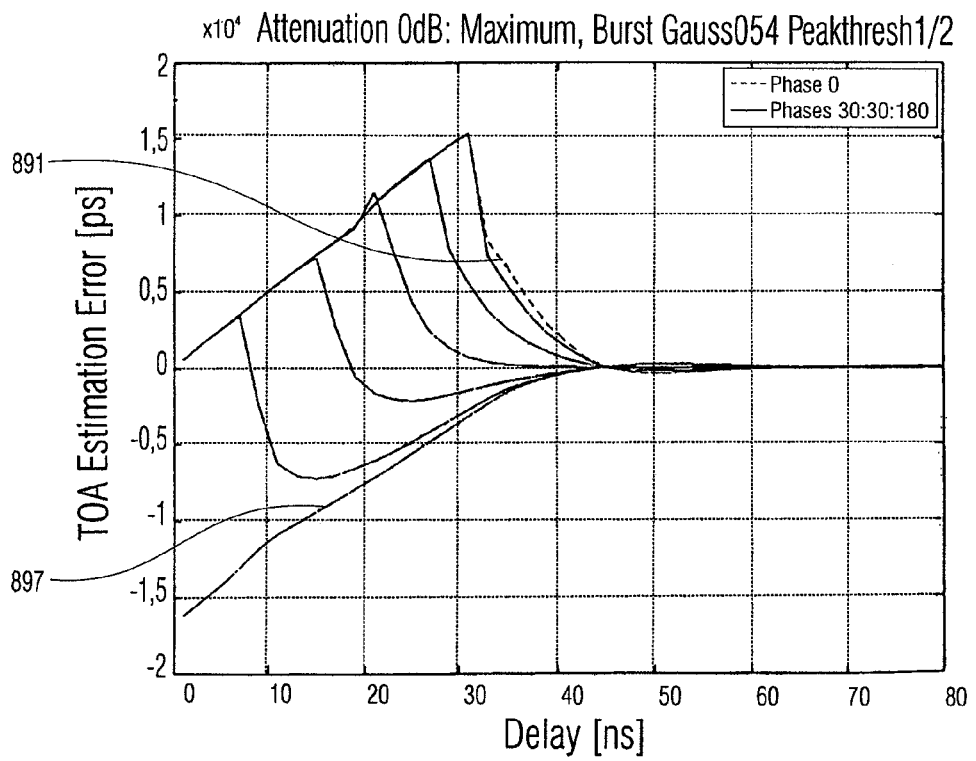
Figure 7C:
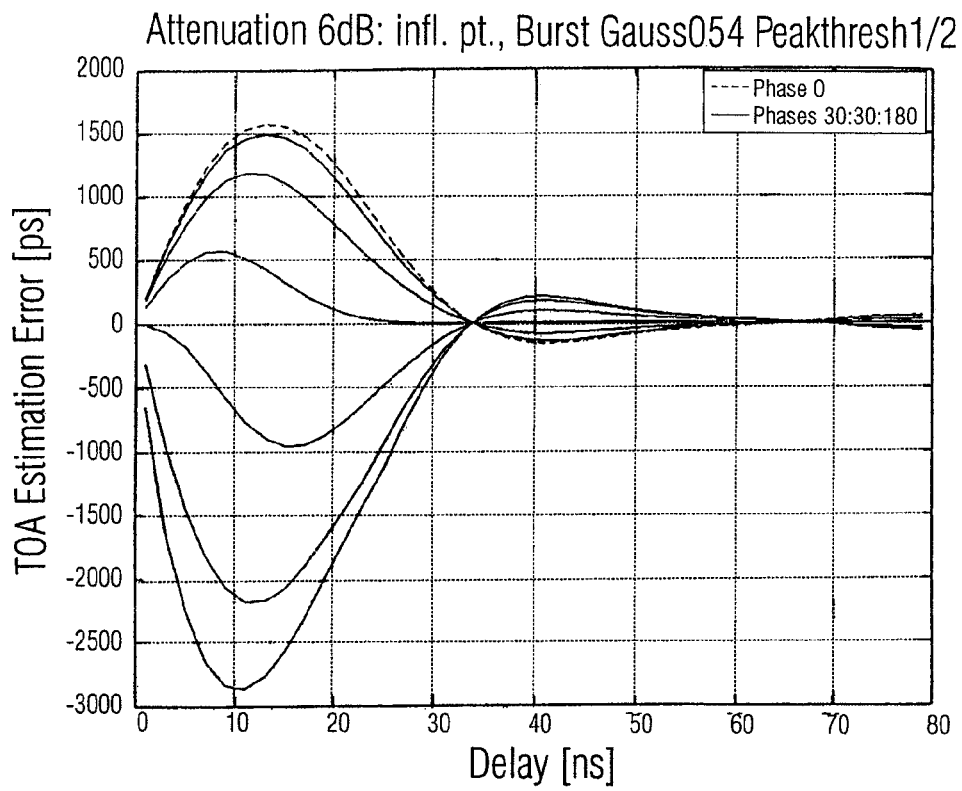
Figure 7D:
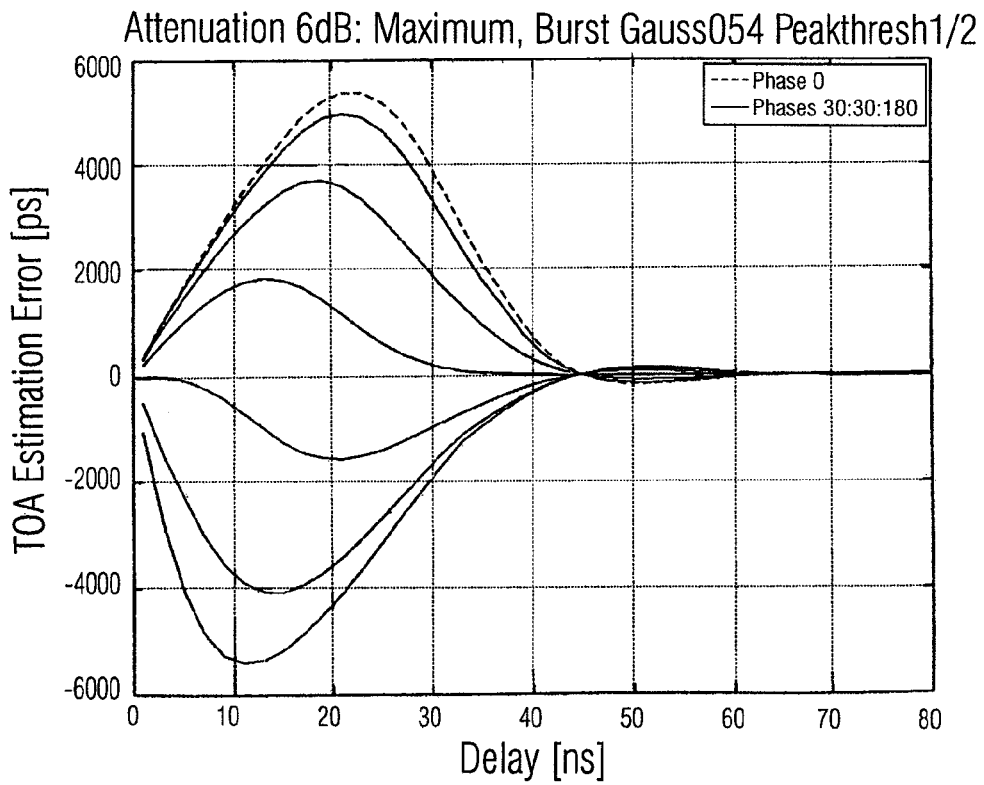
Figure 7E:
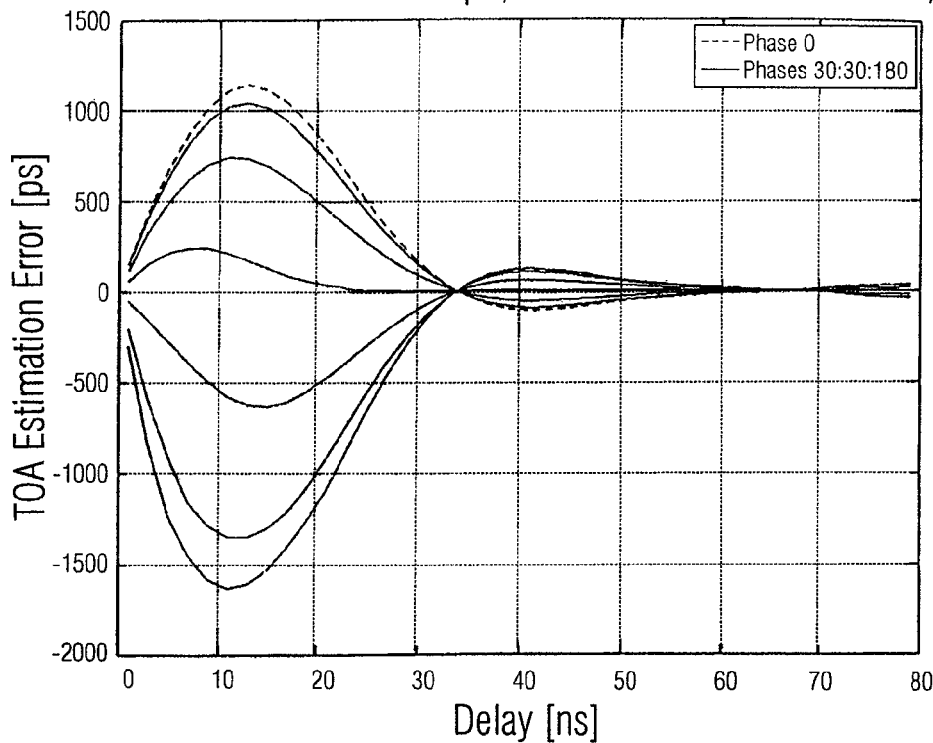
Figure 7F:
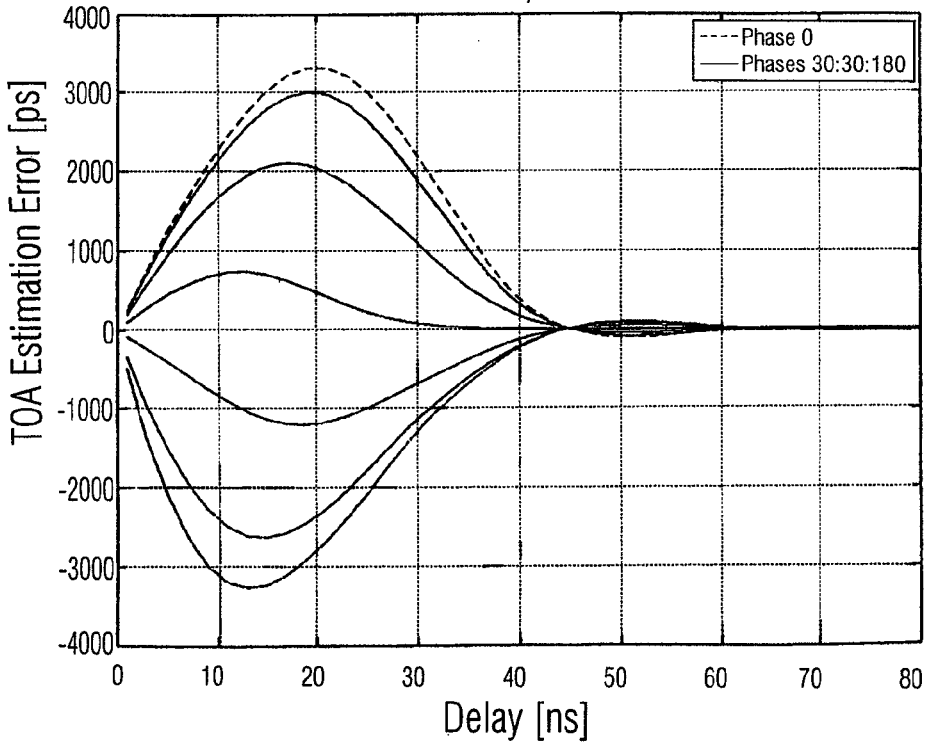
Figure 8:
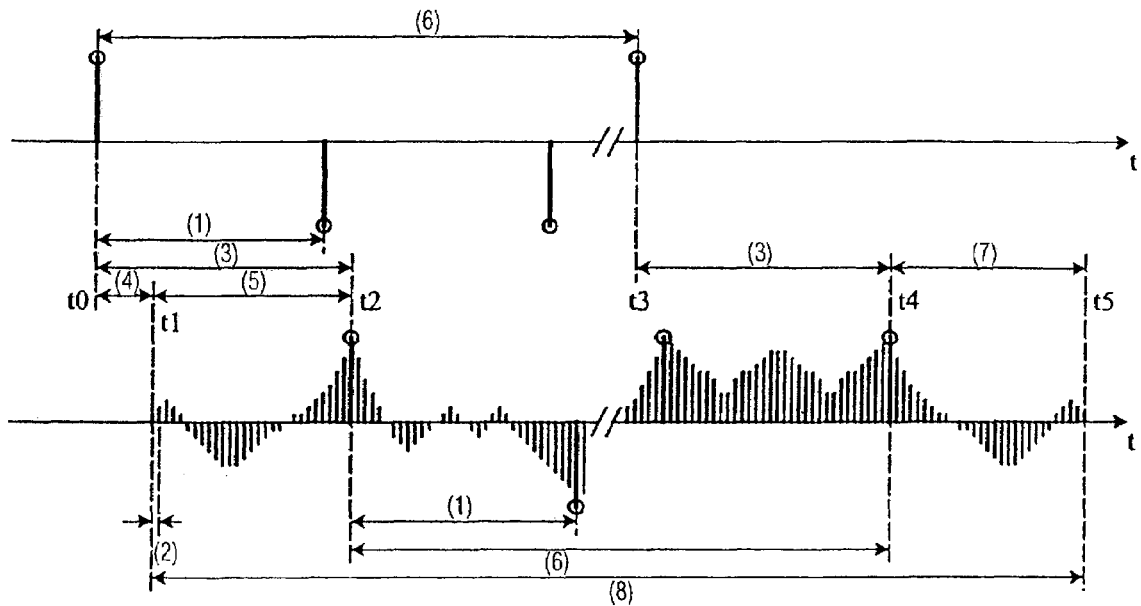
FIG. 8 is a graphic representation of a delay of a synchronization burst in accordance with one embodiment of the present invention.

The graphic representations in FIGS. 4C and E correspond to the representation in FIG. 4A, FIG. 4C being based on an attenuation of 6 dB, and FIG. 4E being based on an attenuation of 10 dB. FIGS. 4C and 4E, in turn, depict envelopes 891, 897. Accordingly, the representations in FIGS. 4D and 4F correspond to the representation of FIG. 4B, FIG. 4D, in turn, being based on an attenuation of 6 dB, and FIG. 4F being based on an attenuation of 10 dB. FIGS. 4D and 4F also designate envelopes 891, 897.

In correspondence with FIGS. 4A to 4F, FIGS. 5A to 5F depict the TOA estimation error on the basis of the RRC024 waveform, FIGS. 6A to 6F on the basis of RRC10 waveform, and FIGS. 7A to 7F on the basis of Gauss054. In FIGS. 5 to 7, error envelopes 891, 897 are provided with reference numerals only in the first FIGS. 5A, B, to 7A, B, respectively.

In almost all of the configurations examined in FIGS. 4 to 7 it may be seen that the inflection-point criterion provides clearly smaller TOA estimation errors than the maximum criterion. If the second path is highly attenuated as compared to the first, its influence on the TOA error will be smaller. However, this effect may be observed mainly for large delays. With small delays, a highly attenuated second path will also result in a marked TOA error.

The TOA error is largest whenever the delayed path only has a delay of below 30 ns with regard to the first path. This applies to the utilization of the favorable inflection-point criterion and of an advantageous waveform. This may be assumed, since this result may also be generalized for more propagation paths. Only those paths having delays of less than 30 ns are critical.

In the following, the RRC bursts will be contemplated.

With all RRC bursts, with equally strong paths, i.e. with an attenuation of 0 dB and for phases smaller than 180 degrees, the TOA error will initially rise in an almost linear manner with the inflection-point method, or in a practically linear manner with the maximum method. This is due to the fact that the second path causes the main maximum, or the inflection point of the correlation curve, to shift to the right. With the maximum method, the error will then at some point abruptly jump to 0. This occurs at that delay where the main peak separates into two peaks, and the algorithm then suddenly detects the correct first peak which belongs to the first path.

For the phase of 180, and also for an attenuation of 0 dB, the TOA error is already very highly negative at a very small delay of 1 ns. This means that the correlation curve arising here exhibits a very pronounced left-hand secondary ripple, and that the algorithm erroneously evaluates this main peak. With an increasing delay, the left-hand secondary ripple gradually merges with the main peak, so that the negative TOA error increases and disappears.

For an attenuation ≧6 dB, it may be observed that the TOA error continually oscillates back and forth between negative and positive values. There are also individual delay values which may lead to a TOA error of 0.

With the RRC003 burst, the TOA error decays very slowly for an increasing delay/the TOA error for an increasing delay decays very slowly only. Even after a delay of 80 ns between the two paths, the error is still considerable, for example at 1,000 ps for an attenuation of 0 dB, because the pulse response of the RRC003 burst, and thus the influence of the delayed second path, disappear very slowly.

With regard to an increasing roll-off, one may see that the TOA error for an increasing delay decays very much faster, which is due to the pulse response being flatter and decaying faster. However, no uniform tendency may be found for small delays. Here, the RRC024 burst causes the largest TOA error.

For determining the time of arrival in the correlator, the inflection-point method should be used, if possible, since it leads to better results for estimating the time of arrival.

For equally strong paths and small delays, the band-limited Gauss pulse Gauss054 provides advantages. The error may amount up to −12 ns, but a positive error is smaller than +2 ns.

On the basis of the properties described, it would be possible to design even more favorable waveforms which may advantageously be used as transmit sequences for the inventive approach.

Depending on the environmental conditions under which the inventive devices are employed, different ones of the waveforms introduced may be advantageous. Advantageously, for the first and second transmit sequences, different waveforms are employed which result in an averaged time of arrival, the error of which is compensated for toward 0, as far as possible, on account of the averaging.

Further embodiments of the inventive approach will be described below.

In the following embodiment, the receive sequences will be referred to as T bursts, the synchronization sequence will be referred to as an A burst, the receive device will be referred to as the receiver and the transmit device will be referred to as the transmitter.

In accordance with this embodiment, the T bursts may be programmed within the transmitter. After the emission, they are characterized in that their bandwidth does not exceed the value of t_burstbw (shown in FIG. 10u), their time duration approximately amounts to the adjustable value of t_burstlen (shown in FIG. 10v) B_cycles, plus an additional temporal expansion in the transition from programmed-in B_samples to the physical signal, e.g. interpolation, dispersive analog circuits, the maximum time duration of t_burstmaxlen (shown in FIG. 10w) amounts to B_cycles, plus the above expansions, which is predefined by the transmitter implementation, their SNIR downstream from the transmitter output amounts to the value of senderSNIR (shown in FIG. 10s) or better.

Within the transmitter, two T bursts may be programmed which are emitted in accordance with a programmable selection scheme. These two T bursts shall be referred to as T burst 0 and T burst 1, respectively, below. Each of the two T bursts is present in complex-valued B_samples, i.e. the T-burst signal to be emitted is sampled, within I and Q components, respectively, at the sample frequency of B_clock.

The T bursts are generated such that they are controlled in an optimum manner in a 6 quantization used. This means that the value of +31 which may maximally be depicted is actually adopted by the signal.

In multiplexing from A and T bursts, precisely one A burst and, subsequently, at_multipl_len (shown in FIG. 10f) T bursts are sent within an acquisition period, the value of at_multipl_len being adjustable. This scheme is continued periodically. Adjustable intervals must be kept between the A burst and the first T burst within a period, between the individual T bursts, and between the last T burst of a period and the A burst of the next period.

Within the transmitter there exists a counter at_multipl_cntr which is reset to 0 before the start of the A burst, and is increased by 1 after each fully emitted T burst. The maximum value of at_multipl_cntr thus amounts to at_multipl_len.

For the time multiplex, the A burst present in B_samples will be contemplated.

When the "relevant A burst", in B_samples, is mentioned below, what is meant is only the below-described part of the "generated A burst", in B_samples, which was generated by transmit pulse formation, upsampling and upconversion, on the basis of an A burst present in B_samples_48, for example directly within the transmitter itself, as is present at the multiplexer input.

Figure 9:
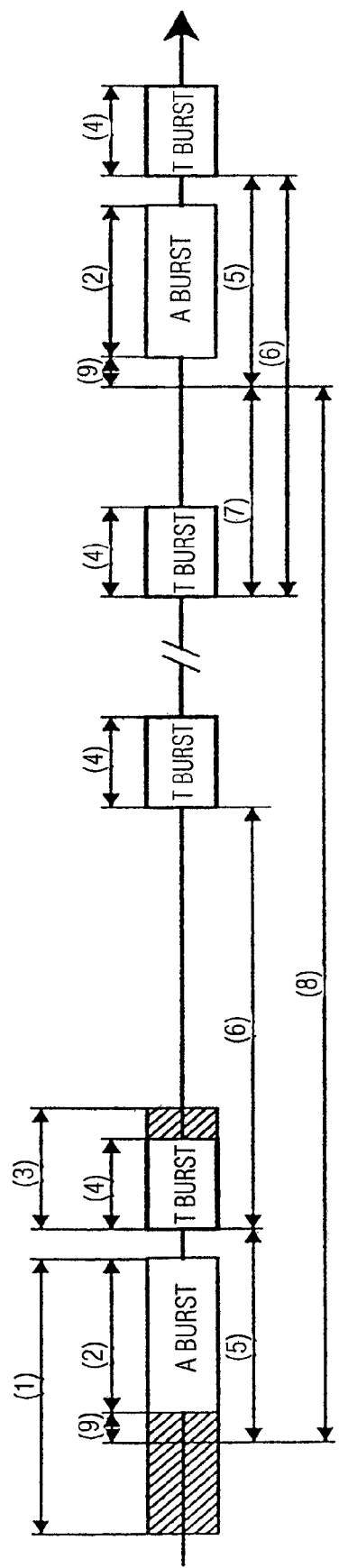
FIG. 9 is a graphic representation of a burst multiplex scheme.

FIG. 9 illustrates which part of the generated A burst is meant by "relevant A burst". The upper half of the image depicts the "underlying A burst" in B_samples_48, the distance (1) between two samples thus being B_cycle_48. Its entire length (6) is a_burstlen, in B_cycles_48.

FIG. 9 shows delays and time durations of the A burst stored within B_samples_48, of the A burst in B_samples which is generated by means of transmit pulse formation, upsampling and upconversion, and of the relevant A burst.

The bottom half shows the generated A burst in B_samples. The distance (2) between two samples is thus B_cycle.

At a time t0, the first B_sample_48 of the A burst stored is input into the signal generation, transmit pulse formation, upsampling and upconversion. Depending on the implementation, this first B_sample_48 of the A burst stored does not appear in the A burst generated until the time t2, i.e. after a delay (3). This delay consists of two components. Buffering in the signal generation for pipelining etc. results in an initial delay (4) from the time t0, where the first B sample_48 of the A burst stored is introduced into the signal generation, up to the point t i, when the first valid B_sample of the A burst generated is output by this signal generation. In addition, all utilized filters, transmit pulse formers and upsampling low passes have group run times which cumulate to a filter run time (5). If the A burst generated is created offline, then the delay (4)=0, unless the transmitter introduces additional pipelining. However, the delay caused by the transient oscillations of the filters, i.e. their group run times, are present and to be noted.

If the last B_sample_48 of the A burst stored is input into the signal generation at the time t3, it will also not appear, as the B_sample at the output of the signal generation, until the time t4 after the delay (3). The last valid B_sample of the A burst generated is output by the signal generation at the time t5. After the time duration (7), i.e. t5—t4, all filters have decayed. In the filters comprising symmetrical pulse response, which are typically used, the time duration (7) equals the cumulated group run times (5).

The cumulated pulse widenings caused by dispersive filters, i.e. sum of transient-oscillation and decay times, (5)-+-(7), must not exceed the value of a_maximpwiden B_samples, so that proper functioning of the overall system, in particular of the receiver, is ensured.

The overall length, expressed in valid B_samples of the generated A burst, is thus (8), i.e. the sum of (5), (6) and (7). Since (5) and (7) are dependent on the implementation, in the following, (6) (i.e. a_burstlen, expressed in B_sample_48) will be regarded as the length of the relevant A burst. In a different representation, in the unit B_samples, a_burstlen_B is the distance from the first to the last B_sample, which are associated with the first, or last, B_sample_48, respectively, of the stored A burst.

The length of the relevant A burst which shall be contemplated below thus also contains no signal broadenings whatsoever which may be caused by the dispersive filter pulse responses in the signal generation, transmit impulse formers and upsampling low passes, as well as no potential further implementation-dependent signal broadenings.

The scheme depicted in FIG. 10 visualizes the multiplex, the burst durations and the distances.

All time ratios indicated by FIG. 10 apply within the multiplexer which, within the transmitter, switches between the A burst and the T burst.

Thus, at this point, the A and T bursts are both present in B_samples.

All time indications apply to the relevant A burst, respectively.

When, in the following, mention is made of T burst, what will be meant by this is one of the two T bursts which have been programmed in.

FIG. 10 shows time durations and distances within the burst multiplex.

The relevant A burst exhibits the length of a_burstlen, in B_cycles_48, which is shorter than the maximum length a_burstmaxlen in B_cycles_48 of the rel. A burst needs to be.

The T burst exhibits the length of t_burstlen in B_cycles, which is shorter than the maximum T-burst length t_burstmaxlen, in B_cycles, needs to be.

The pause between the rear end of the rel. A burst and the beginning of the T burst should keep a specified value, even if A and/or T bursts of different lengths are used in the system. If the rel. A burst is made shorter or longer, this means that only its beginning, foremost stop, should be shifted accordingly. If the T burst is made shorter or longer, then consequently only its rear stop should shift accordingly.

The distance from the start of the relevant A burst to the start of the subsequent T burst may be adjusted using two parameters. The distance at_dist from the triggering for the generation of the A burst up to the start of the subsequent T burst is adjustable in the unit of S_cycles. In addition, the initial delay a_initdel from the triggering to the start of the rel. A burst, in accordance with the above definition, is adjustable within the unit of B_cycles. the actual distance from the beginning of the rel. A burst to the beginning of the T burst is thus at_dist [s_cycles]-a_initdel [B_cycles].

For reasons of implementation, the distance at_dist is present in the unit of S_cycles.

For reasons of implementation, the distance t_burstperiod between the starts of two successive T bursts of an acquisition period is also adjustable in the unit of S_cycles.

The three burst distances are not freely adjustable, but must meet the following requirement:

$$ta\_dist + at\_dist = t\_burstperiod.$$

The distance a_burstperiod between the starts of the A bursts of two successive acquisition periods is not adjustable in the transmitter, but results from the other adjustable parameters:

$$a\_burstperiod[S\_cycles] = at\_multipl\_len * t\_burstperiod [S\_cycles]$$

In accordance with an underlying scheme which is based on a "prime number algorithm", specific burst repetition rates are allocated to the transmitter, which, however, are slightly different from transmitter to transmitter, rather than synchronized pseudo random patterns. Thus, this is a method in accordance with which the burst distances of a transmitter are randomly selected, so that there is no specific pattern of burst overlaps.

Of the two T bursts stored within the transmitter, one is selected for emission. The selection is performed by means of a bit t_choice, which is obtained from the counter at_multipl_cntr using a programmable mask t_choice_mask in accordance with the following specification:

$$t\_choice = ( t\_choice\_mask[0] \text{ AND } at\_multipl\_cntr[0]$$
$$\text{OR } (t\_choice\_mask[1] \text{ AND } at\_multipl\_cntr[1].$$

Here, variable[0] represents bit No. 0 (i.e. the LSB) of a variable, and variable[1] represents bit No. 1, and further, AND or OR, respectively, represent AND or OR, respectively, in a bit-wise manner.

If t_choice has the value of 0, T burst 0 will be emitted; with t_choice=1, T burst 1 will be emitted.

Thus, T burst 0 will be emitted for t_choice_mask=00 (LSB on the right-hand side).

For t_choice_mask=01, a shift is performed, after every T burst, between T burst 0 and T burst 1, starting with T burst 0 after the A burst.

For t_choice mask=10, a shift is performed, after every other T burst, between T burst 0 and T burst 1, starting with T burst 0 after the A burst, i.e. what is emitted is: T burst 0, T burst 0, T burst 1, T burst 1, T burst 0, T burst 0, T burst 1, . . .

t_choice_mask=11 is not a sensible choice and must not be set.

Two transmit antennas may be present within the transmitter. It is possible to either use both at the same time or to select only one of them. If both are to be used, a programmable bit two_ants (shown in FIG. 16*af*) is set to the value of 1. If two_ants==0, only one of the two transmit antennas is selected for emission in each case. The selection is performed by means of a bit ant_choice, which is obtained from the counter at_multipl_cntr using a programmable mask ant_choice_mask (shown in FIG. 16*d*) in accordance with the following specification:

ant_choice=(ant_choice_mask[0] AND at_multipl_cntr[0])

OR (ant_choice_mask[1] AND at_multipl_cntr[1]).

Here, variable[0] represents bit No. 0, i.e. the LSB, of a variable, and variable[1] represents bit No. 1, and further, AND or OR, respectively, represent AND or OR, respectively, in a bit-wise manner.

If ant_choice has the value of 0, emission is performed on antenna 0; in the case of ant_choice==1, emission is performed on antenna 1.

However, this only applies to two_ants==0. With two_ants==1, each burst is emitted on two antennas. For two_ants==0, the following scheme results:

For ant_choice_mask==00 (LSB on the right-hand side), emission is performed on antenna 0.

For ant_choice_mask==01, a shift is performed between antenna 0 and antenna 1 after every T burst, starting with antenna 0 for the A burst and the subsequent T burst.

For ant_choice_mask==10, a shift is performed between antenna 0 and antenna 1 after every other T burst, starting with antenna 0 for the A burst and the subsequent T burst, i.e. emissions are successively conducted on: antenna 0, antenna 0, antenna 1, antenna 1, antenna 0, antenna 0, antenna 1, . . .

ant_choice_mask==11 is not a sensible choice and must not be set.

FIGS. 10*a*-10*af* define the variables defined in the preceding embodiment.

Figure 11:
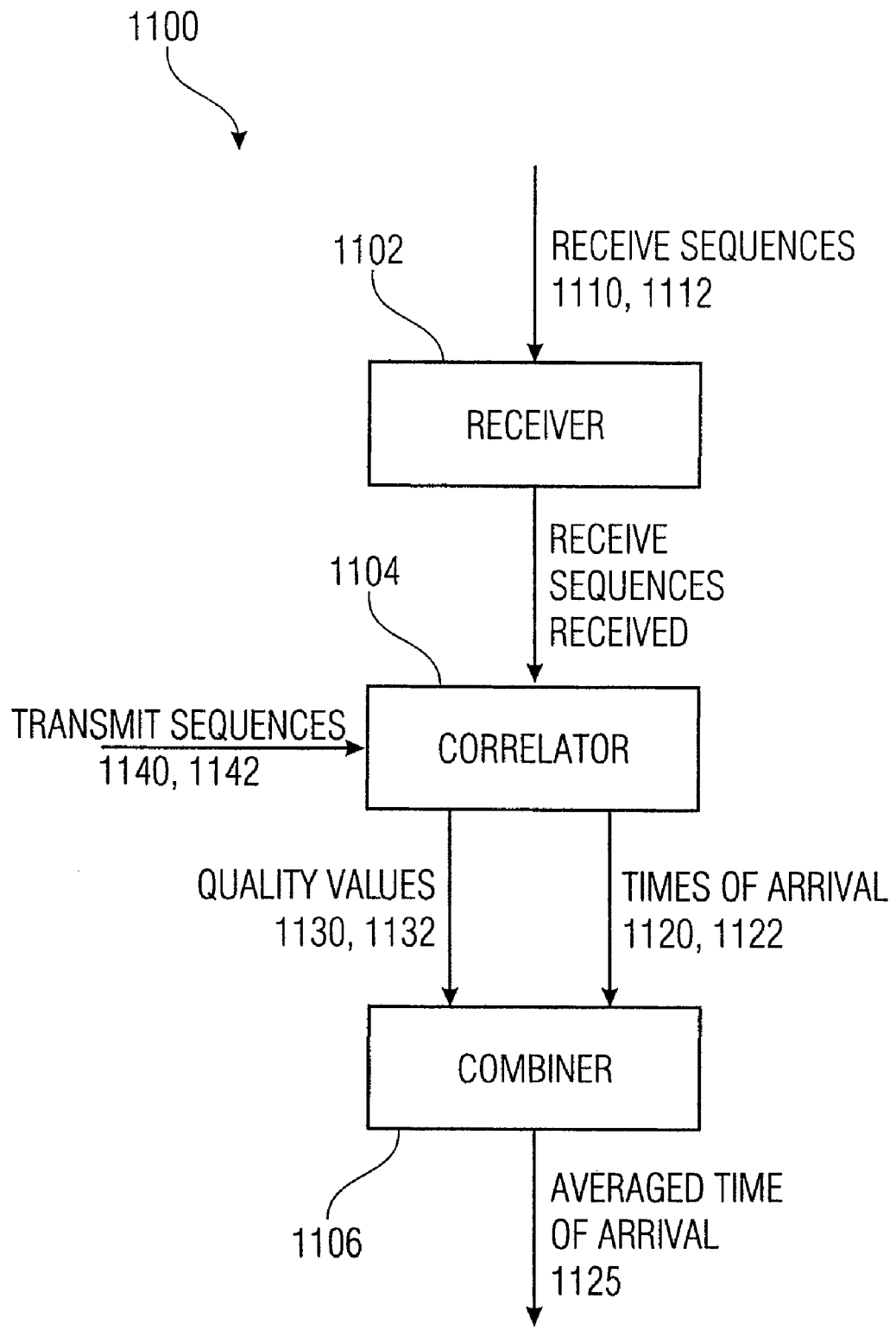
FIG. 11 is a block diagram of a receive means in accordance with the present invention.

FIG. 11 shows a block diagram of a receive means in accordance with an embodiment of the present invention comprising a receiver 1102, a correlator 1104 and a combiner 1106. The receiver 1102 of the receive device 1100 is configured to receive sequences of a transmitter. In this embodiment, receiver 1102 is configured to receive a first receive sequence 1110 and a second receive sequence 1112. The receiver 1102 is configured to provide the receive sequences received to the correlator. The correlator 1104 is configured to determine a first time of arrival 1120 of the first receive sequence 1110 in the receive device 1100, and a second time of arrival 1122 of the second receive sequence 1112 in the receive means 1100, and to provide them to the combiner 1106. The combiner 1106 is configured to combine the times of arrival 1120, 1122 with each other and to determine a combined time of arrival, in this case an averaged time of arrival 1125, and to provide it for further processing.

In accordance with one embodiment, only those times of arrival 1120, 1122 which have high quality values will be further used in the receiver. Alternatively, the quality values 1130, 1132 are taken into account in the combiner 1106 via a weighting when calculating the averaged time of arrival 1125. This means that the weighting coefficient depends on the two quality values 1130, 1132. The higher the quality of the receive sequences 1110, 1112, or of the times of arrival 1120, 1122 determined therefrom, the higher the weighting in an averaging operation for determining the averaged time of arrival 1125.

The averaged time of arrival 1125 may result from an arithmetic averaging from the times of arrival 1120, 1122. If the quality values 1130, 1132 are taken into account in determining the averaged time of arrival 1125, the determination of the averaged time of arrival 1125 may be determined from an arithmetic averaging from the weighted times of arrival. To this end, the first time of arrival 1120 may be weighted with the first quality value 1130, and the second time of arrival 1122 may be weighted with the second quality value 1132.

For a navigation application for determining the transmitter location, several of the receive means 1100 depicted in FIG. 11 may be combined with one another. Such a localization system may then comprise one of the transmit devices 200 shown in FIGS. 2 and 3, as well as a receiver system consisting of a plurality of the receive means 100 shown in FIG. 1. Such a system for determining a location of the transmit device 200 is shown in FIG. 12.

In accordance with this embodiment, the receiver system comprises a first receive means 1100*a* and a second receive means 1100*b*. Both receive means 1100*a*, 1100*b* are configured to receive the first receive sequence 1110 and the second receive sequence 1112. The receive sequences 1110, 1112 correspond to the transmit sequences 1240, 1242 which were emitted by the transmit device 1200 and transmitted to the receive means 1100*a*, 1100*b* via transmission channels. The first receive means 1100*a* is configured to provide a first averaged time of arrival 1125*a* to an evaluation means 1472, and the second receive means 1100*b* is configured to provide a second averaged time of arrival 1125*b* to the evaluation means 1472. The evaluation means 1472 is configured to determine the location of the transmitter 1474 from the averaged times of arrival 1125*a*, 1125*b*. The determination of the location on the part of the evaluation means 1472 may be effected by a comparison of the run times of the receive sequences 1110, 1112 from the transmit device 1200 to the receive means 1100*a*, 1100*b*. Typically, a positioning system comprises more than two receive devices.

In accordance with one embodiment, the receiver system comprises a clock generator and a trigger generator, the signals of which are provided to the receive means 1100*a*, 1100*b* via an optical network. It is the purpose of the trigger to cause all time-of-arrival time counters in the receive means 1100*a*, 1100*b* to start in a synchronized manner.

Figure 12:
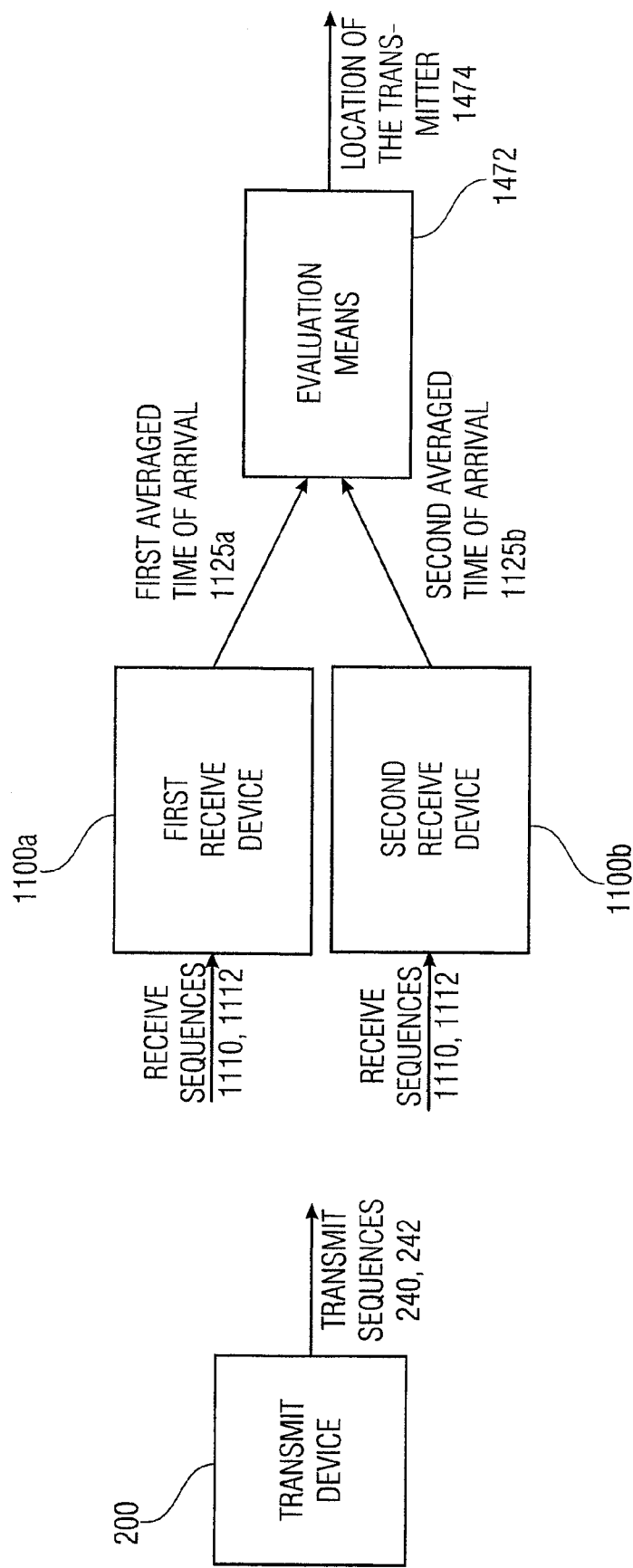
FIG. 12 is a block diagram of a communication device in accordance with an embodiment of the present invention.

In the localization application depicted in FIG. 12, in turn, quality values may be calculated for evaluating the multipath influence, and may be used for selecting the times of arrival used.

The times of arrival 1125*a*, 1125*b* estimated in the receivers 1100*a*, 1100*b* are combined with one another in the evaluating means 1472 for calculating the location of the transmit device.

The transmit devices, receive devices and receive means described may be combined with one another. In addition, specific features which are described for individual embodiments only may also be transferred to adequate embodiments.

Depending on the circumstances, the inventive method may be implemented in hardware or in software. Implementation may be on a digital storage medium, in particular a disk or CD with electronically readable control signals which may interact with a programmable computer system such that the respective method is performed. Generally, the invention thus also consists in a computer program product with a program code, stored on a machine-readable carrier, for performing the inventive method, when the computer program product runs on a computer. In other words, the invention may thus be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A communication system comprising:
a transmitter device comprising a transmitter for sending out a first transmit sequence and a second transmit sequence, the transmitter device being constructed so that each transmit sequence:
(i) exhibits a different time signal and a different spectrum or
(ii) is sent by a different of two antennas of the transmitter device; and
a receive device for determining a location of the transmitter device, the receive device comprising:
an evaluator formed to determine a first location of the transmitter device from a time of arrival of a first receive sequence, and a second location of the transmitter device from a time of arrival of a second receive sequence, the receive sequences corresponding to the different transmitted transmit sequences of the transmitter device; and
a combiner formed to determine the location of the transmitter device from the first location and the second location.

2. The communication system as claimed in claim 1, the receive device further comprising:
receiver formed to receive the first receive sequence and the second receive sequence, each of the receive sequences comprising a plurality of successive values, and the receiver comprising a correlator formed to determine the time of arrival of the first receive sequence and the time of arrival of the second receive sequence.

3. The communication system as claimed in claim 1, wherein the combiner is formed to determine the location from an arithmetic averaging of the first location and the second location.

4. The communication system as claimed in claim 2, wherein the correlator is formed to determine a first quality value of the first receive sequence and a second quality value of the second receive sequence, and wherein the combiner is formed to include the quality values in the determination of the location by means of weighting.

5. The communication system as claimed in claim 4, wherein the combiner is formed to weight the first location with the first quality value, and the second location with the second quality value, and to determine the location from averaging the weighted first location and the weighted second location.

6. The communication system as claimed in claim 4, wherein the correlator is formed to determine a signal/noise ratio of the receive sequences and to provide same as a quality value.

7. The communication system as claimed in claim 4, wherein the correlator is formed to determine a multipath influence on the receive sequences and to provide same as a quality value.

8. The communication system as claimed in claim 2, wherein the correlator is formed to determine the first time of arrival from a correlation of the first receive sequence with a first transmit sequence, and the second time of arrival from a correlation of the second receive sequence with a second transmit sequence.

9. The communication system as claimed in claim 8, wherein the first receive sequence and the second receive sequence arrive at the receiver in a predetermined succession, and wherein the correlator is formed to provide the first transmit sequence and the second transmit sequence in the predetermined succession.

10. The communication system as claimed in claim 8, wherein the receiver is formed to receive a synchronization sequence, and wherein the correlator is formed to provide, in response to reception of the synchronization sequence, the first transmit sequence and the second transmit sequence in the predetermined succession for correlation.

11. The communication system as claimed in claim 2, wherein the successive values of the first receive sequence differ from the successive values of the second receive sequence.

12. The communication system as claimed in claim 1, wherein the first receive sequence and the second receive sequence comprise different spectral properties.

13. The communication system as claimed in claim 1, wherein the first receive sequence and/or the second receive sequence corresponds to a differentiated Gauss transmit pulse, a band-limited Gauss transmit pulse or a root raised cosine burst.

14. The communication system as claimed in claim 2, wherein the receiver is further formed to receive a further receive sequence, and wherein the correlator is formed to determine a further time of arrival of the further receive sequence, and wherein the evaluator is formed to determine a further location of the transmitter device from the time of arrival of the further receive sequence, and wherein the combiner is formed to determine the location of the transmitter device from the first, second and further locations.

15. The communication system as claimed in claim 2, wherein the evaluator is formed to determine the first location of the transmitter device from the time of arrival of the first receive sequence and from a further time of arrival of the first receive sequence, and to determine the second location of the transmitter device from the time of arrival of the second receive sequence and from a further time of arrival of the second receive sequence.

16. The communication system as claimed in claim 15, the receive device comprising a further receiver formed to receive the first receive sequence and the second receive sequence, the further receiver comprising a further correlator formed to determine the further time of arrival of the first receive sequence, and the further time of arrival of the second receive sequence.

17. The communication system as claimed in claim 1, wherein the transmitter device comprises a first antenna, and wherein the transmitter is formed to send out the first transmit sequence and the second transmit sequence via the first antenna in accordance with a predetermined succession.

18. The communication system as claimed in claim 1, wherein the transmitter device comprises a first antenna and a second antenna, and wherein the transmitter is formed to send out, in accordance with a predetermined succession, the first transmit sequence via the first antenna and the second transmit sequence via the second antenna.

19. A method for determining a location of a transmitter device, comprising:

receiving a first time of arrival of a first receive sequence, and a second time of arrival of a second receive sequence, the receive sequences corresponding to different transmitted transmit sequences of the transmitter device, wherein each transmit sequence (i) exhibits a different time signal and a different spectrum or (ii) is sent by a different of two antennas of the transmitter device;

determining a first location of the transmitter device from the time of arrival of the first receive sequence, and a second location of the transmitter device from the time of arrival of the second receive sequence; and determining the location of the transmitter device from the first and second locations.

20. A computer program comprising a program code for performing, when the computer program runs on a computer, a method for determining a location of a transmitter device, the method comprising:

receiving a first time of arrival of a first receive sequence, and a second time of arrival of a second receive sequence, the receive sequences corresponding to different transmitted transmit sequences of the transmitter device, wherein each transmit sequence (i) exhibits a different time signal and a different spectrum or (ii) is sent by a different of two antennas of the transmitter device;

determining a first location of the transmitter device from the time of arrival of the first receive sequence, and a second location of the transmitter device from the time of arrival of the second receive sequence; and determining the location of the transmitter device from the first and second locations.

21. The communication system as claimed in claim 1, wherein the combiner combines a first location and a second location, wherein the first location and the second location are obtained by evaluating the time of arrival of the first receive sequence and the second receive sequence.

* * * * *